United States Patent
Ausubel

(10) Patent No.: US 7,165,046 B2
(45) Date of Patent: Jan. 16, 2007

(54) SYSTEM AND METHOD FOR AN EFFICIENT DYNAMIC MULTI-UNIT AUCTION

(75) Inventor: Lawrence M. Ausubel, Washington, DC (US)

(73) Assignee: Efficient Auctions LLC, Washington, DC (US)

( * ) Notice: Subject to any disclaimer, the term of this patent is extended or adjusted under 35 U.S.C. 154(b) by 1241 days.

(21) Appl. No.: 09/898,483

(22) Filed: Jul. 5, 2001

(65) Prior Publication Data

US 2002/0052828 A1 May 2, 2002

Related U.S. Application Data

(63) Continuation-in-part of application No. 09/573,007, filed on May 18, 2000.

(60) Provisional application No. 60/294,246, filed on May 31, 2001, provisional application No. 60/293,510, filed on May 29, 2001, provisional application No. 60/229,600, filed on Sep. 5, 2000, provisional application No. 60/216,338, filed on Jul. 5, 2000.

(51) Int. Cl.
*G06Q 40/00* (2006.01)
(52) U.S. Cl. .................... 705/37; 705/16; 705/39; 705/80; 705/35
(58) Field of Classification Search .................. 705/37, 705/16, 39, 80, 35
See application file for complete search history.

(56) References Cited

U.S. PATENT DOCUMENTS

| | | | | |
|---|---|---|---|---|
| 3,581,072 A | * | 5/1971 | Nymeyer | 705/37 |
| 5,835,896 A | * | 11/1998 | Fisher et al. | 705/37 |
| 6,272,473 B1 | * | 8/2001 | Sandholm | 705/37 |
| 6,415,270 B1 | * | 7/2002 | Rackson et al. | 705/36 R |
| 6,449,601 B1 | * | 9/2002 | Friedland et al. | 705/37 |
| 2005/0187859 A1 | * | 8/2005 | Growney et al. | 705/37 |

OTHER PUBLICATIONS

Bronfman et al. "An experimental examination of the Walrasian tatonnement mechanism" Rand Journal of Economics, vol. 27, No. 4 (winter 1996), 681-699.*

Rothkopf et al. "Computationally Manageable Combinational Auctions", Management Science, vol. 44, No. 8 (Aug. 1998), pp. 1131-1147.*

* cited by examiner

*Primary Examiner*—Ella Colbert
*Assistant Examiner*—Harish T. Dass
(74) *Attorney, Agent, or Firm*—Connelly Bove Lodge & Hutz LLP

(57) ABSTRACT

The present invention implements an auction in which multiple types of goods may be auctioned in a dynamic process. In a preferred embodiment, the present invention is a system and method for a computer implemented dynamic multi-unit auction in which the price paid or received by bidders tends to be independent of their own bids, in which participants may be provided with information concerning their competitors' bids as the auction progresses, and in which the confidentiality of high values may be maintained. Participants' quantities bid at a given time may be restricted to be less than or equal to the quantities bid at an earlier time. These features provide the advantage of improving economic efficiency of the auction design over the prior art.

80 Claims, 12 Drawing Sheets

SYSTEM AND METHOD FOR AN EFFICIENT DYNAMIC MULTI-UNIT AUCTION

RELATED APPLICATIONS

This application is a continuation-in-part of my prior application "System and Method for an Efficient Multi-Unit Auction," Ser. No. 09/573,007, filed May 18, 2000.

This application is also related to prior applications Ser. Nos. 60/216,338 filed Jul. 5, 2000; 60/229,600 filed Sep. 5, 2000; as well as Provisional Applications entitled "System and Method for an Efficient Dynamic Auction for Multiple Types of Items," filed May 29, 2001, bearing Ser. No. 60/293,510, and "System and Method for an Efficient Dynamic Auction for Multiple Types of Items," filed May 31, 2001, bearing Ser. No. 60/294,246. The disclosures of the foregoing applications are incorporated herein by this reference.

FIELD OF THE INVENTION

The present invention relates to improving computer-implemented auctions and, more particularly, to computer implementation of an efficient dynamic multi-unit auction.

BACKGROUND OF THE INVENTION

Auction formats in the art tend generally to be of the sealed-bid or ascending-bid variety. In the standard sealed-bid auction, bidders—in one single bidding round—simultaneously and independently submit bids to the auctioneer, who then determines the auction outcome. In the standard ascending-bid auction, bidders—in a dynamic bidding process—submit bids in real time until no more bids are forthcoming. An ascending-bid format offers the advantage that there is feedback among participants' bids: each bidder is able to infer other bidders' information about the value of the item(s) as the auction progresses and incorporate this information into his subsequent bids. This feedback tends to result in more efficient auction outcomes as well as in more aggressive bidding, resulting in higher expected revenues for the seller.

However, standard ascending-bid formats—such as the design used by the Federal Communications Commission for auctioning radio communications spectrum—have the disadvantage that they do not generally lead to outcomes which are efficient in the sense of assigning items to the bidders who value them the most. Most ascending-bid auction formats have the unfortunate property that identical items sell at the uniform price reached at the end of the auction. This creates incentives for bidders to engage in demand reduction: bidders have incentive to understate the values that they place on marginal units in order to reduce the market-clearing price (and, hence, the price they will pay on the inframarginal units that they will win in any case). This has clear negative implications both for efficiency and for revenues.

My prior patent, "System and Method for an Efficient Dynamic Auction for Multiple Objects," (U.S. Pat. No. 6,026,383, issued Feb. 15, 2000) provides an early version of a system and method for a computer-implemented dynamic auction, which may achieve efficiency for situations involving multiple identical objects. The current invention is an improved system and method for a computer-implemented dynamic auction, which improves upon the previous invention both in its efficacy of performance and in the generality of economic environments where it may perform efficiently.

SUMMARY OF THE INVENTION

The present invention is a system and method for implementing on a computer a dynamic multi-unit auction in which the price paid or received by bidders tends to be independent of their own bids, in which participants may be provided with information concerning their competitors' bids as the auction progresses, and in which the confidentiality of high values is maintained. This provides the advantage of improving the economic efficiency of the auction design over the prior art. The present invention usefully enables a seller or buyer to efficiently auction multiple types of goods or services, and to efficiently auction items with complex possibilities for substitution.

The present invention is a computer or computer system that receives bids from a plurality of bidders for a plurality of items in a dynamic bidding process and usually determines an allocation of the items among bidders. The present invention is also a computer-implemented method for receiving bids from a plurality of bidders for a plurality of items in a dynamic bidding process and usually determining an allocation of the items among bidders. The present invention is also a machine-readable medium having stored thereon data representing sequences of instructions, which when executed by a computer or computer system, cause said computer or computer system to receive bids from a plurality of bidders for a plurality of items in a dynamic bidding process and usually to determine an allocation of the items among bidders.

In one embodiment, the invention comprises a bidding information processor (BIP) together with an auctioneer terminal (AT) and a plurality of bidder terminals (BT's) which communicate with the bidding information processor via a network. Bidders at the bidder terminals enter bids in multiple rounds, and may observe displayed auction information. The auctioneer at the auctioneer terminal controls the progress of the auction. The BIP, the AT, and the BT's communicate and process information in order to conduct an auction.

Suppose that m (m$\geq$1) types of items are being auctioned, and one or more units of each type are being auctioned. An auction in accordance with an embodiment of the present invention proceeds as follows. First, the auctioneer (i.e., the auctioneer terminal) establishes a price vector, $(P_1, \ldots, P_m)$, which includes a price for each of the m types of items subject to the auction. The auctioneer communicates the price vector to the auction computer (i.e., bidding information processor), which in turn communicates it to bidders (i.e., bidder terminals). Second, plural bidders respond with bid vectors indicating the quantity of each respective type of item that the bidder wishes to transact at the current price vector. Let the bidders be superscripted by i, where $i=1, \ldots, n$. The quantity vector for bidder i is denoted by $(Q_1^i, \ldots, Q_m^i)$. Also, let the quantities of the respective types of items being auctioned be denoted by $(\overline{Q}_1, \ldots, \overline{Q}_m)$. The auction computer then determines, based on the received bids, whether the auction should continue. Typically, the starting price vector is selected such that the aggregate quantity of each type of item desired by all the bidders $$\left(i.e., \sum_{i=1}^{n} Q_k^i\right)$$

is greater than the quantity of each type of item being auctioned (i.e., $\overline{Q}_k$). In this event, the auction computer determines that the auction will continue, and either the auction computer or the auctioneer will establish a revised price vector (which is typically larger in each of its m components than the initial price vector). The auction computer then sends to one or more bidders the revised price vector. Next, plural bidders respond with bid vectors indicating the quantity of each respective type of item that the bidder wishes to transact at the revised price vector. Again, typically, the aggregate quantity of each type of item desired by all the bidders will not equal the available quantity, and a determination is again made that the auction should continue. Nevertheless, one or more items of a particular type may be credited with a particular bidder. The item(s), if any, will be credited at a price in a closed interval between the price contained in the (previous) price vector and the price contained in the revised price vector. In one embodiment, items are credited at the price contained in the revised price vector; in another embodiment, items are credited at the price contained in the (previous) price vector; and in a third embodiment, items are credited at the average of the price contained in the revised price vector and the price contained in the (previous) price vector. In one preferred embodiment, the determination of whether a particular bidder is credited with a selected type of item is based on whether the sum of the bids of other bidders at the revised price vector is different from the sum of the bids of other bidders at the (previous) price vector. In this embodiment, if the two sums are different, the particular bidder is credited with a number of the selected type of items equal to the change in the sum of the bids of other bidders. This process continues until a determination is made that the auction should not continue. In one preferred embodiment, after the determination to end the auction is made, the items are allocated to bidders according to their final bid vectors, and the payments of bidders are based on the cumulative sequence of credits that occurred during the course of the auction.

Certain constraints are desirable in order for this auction to operate optimally and to reach an economically efficient outcome. One exemplary constraint is an activity rule which constrains a bidder not to increase his quantity, summed over the m types of items, from one bid in the auction to the next. Another exemplary constraint is a more stringent activity rule which constrains a bidder not to increase his quantity, summed over a group of types of items, from one bid in the auction to the next. A third exemplary constraint is a more stringent activity rule which constrains a bidder not to increase his quantity, individually on each of the m types of items, from one bid in the auction to the next. A fourth exemplary constraint is a reduction rule which constrains a bidder not to decrease his quantity, for any single type of item, beyond the point where the sum of the quantities bid for this type of item by all bidders equals the sum of the quantities being auctioned. (If, in a given round, two or more bidders simultaneously attempt to decrease their quantities, for any single type of item, having the effect of reducing bids beyond the point where the sum of the quantities bid for this type of item by all bidders equals the sum of the quantities being auctioned, the auction procedure will resolve this discrepancy. For example, the auctioneer may honor these attempts to decrease in order of time priority, or may ration these simultaneous attempts to decrease in proportion to the attempted reductions.)

While an auction following these rules could be conducted manually, computerized conduct of the auction allows the auction to be conducted with all bidding information taken into account, while controlling the degree to which the information itself is disclosed to the participants. Computerized conduct of the auction also allows the auction to be conducted swiftly and reliably, even if bidders are not located on-site. The amount of information which is transmitted to the bidder terminals and/or actually displayed to the bidders may be carefully controlled. In one embodiment, all bidding information is displayed to the bidders. In another embodiment, no bidding information is displayed to the bidders; only the results of the auction are displayed. A number of intermediate embodiments are also possible, in which some but not all bidding information is displayed to the bidders. For example, in one preferred embodiment, the auctioneer disclose only the aggregate quantity bid for each type of item in each round, as opposed to disclosing each individual bid.

My prior patent U.S. Pat. No. 6,026,383 treats auctions for multiple, identical objects and close substitutes. The earlier application's efficient auction with one price clock exploited features of the homogeneous-good environment to construct an eminently-simple dynamic procedure. Unfortunately, the cases of multiple types of related items, or items with complex possibilities for substitution, do not lend themselves to quite as simple a procedure. My other prior patents, "Computer Implemented Methods and Apparatus for Auctions," U.S. Pat. No. 5,905,975, issued May 18, 1999, and U.S. Pat. No. 6,021,398, issued Feb. 1, 2000, describe other auction designs for multiple, dissimilar items. However, the current auction design appears likely in practice to be simpler and to run more swiftly, as well as placing lower computational demands on bidders.

The present invention extends my auction design described in U.S. Pat. No. 6,026,383 to treat-in a simple way-the case of auctioning a set of items which includes two (or more) items that are neither identical nor perfect substitutes to one another, so that two or more price clocks are required. Henceforth, this will be described for short as a situation with "multiple types of multiple items," or simply "heterogeneous items" or "heterogeneous objects." Often, but not always, the heterogeneous items auctioned together will bear some relationship to one another: for example, they may be licenses or rights to perform essentially the same activity at different geographic locations; or they may be securities issued by the same entity but with different durations to maturity; or they may be related goods with slightly different characteristics that render them only imperfect substitutes.

The present invention may also be better suited than previous auction designs for treating the case of identical objects or perfect substitutes which exhibit "increasing returns" for bidders. "Increasing returns" refers to a situation where the extra value that a bidder derives from an $(N+1)^{st}$ unit is greater than the extra value that a bidder derives from an $N^{th}$ unit. For example, this would include a situation where the utility from two units is strictly more than double the utility derived from one unit.

The present invention is useful for conducting auctions involving items offered for sale by the bidders, as well as items offered for sale to the bidders. Although terms such as "vector of quantities demanded" (by a bidder) and "demand curve" (of a bidder) are used to describe the present invention, the terms "vector of quantities offered" (by a bidder) and "supply curve" (of a bidder) are equally applicable. In some cases, this is made explicit by the use of both terms, or by the use of the terms "vector of quantities transacted" (by a bidder) and "transaction curve" (of a bidder). The term "quantities transacted" includes both "quantities demanded" and "quantities offered". The term "bid" includes both offers to sell and offers to buy. The term "transaction curve" includes both "demand curve" and "supply curve". Moreover, any references to "quantities being offered" includes both "quantities being sold" by the auctioneer, in the case this is an auction for selling items, as well as "quantities being bought or procured" by the auctioneer, in the case this is an auction for buying items or procuring items.

Moreover, while standard auctions to sell typically involve ascending prices, the present invention may utilize prices that ascend and/or descend. One useful situation in which the price would be allowed to descend is a procurement auction or "reverse auction," an auction to buy.

Throughout this document, the terms "objects", "items", "units" and "goods" are used essentially interchangeably. The inventive system may be used both for tangible objects, such as real or personal property, and intangible items, such as telecommunications licenses or electric power. The inventive system may be used in auctions where the auctioneer is a seller, buyer or broker, the bidders are buyers, sellers or brokers, and for auction-like activities which cannot be interpreted as selling or buying. The inventive system may be used for items including, but not restricted to, the following: public-sector bonds, bills, notes, stocks, and other securities or derivatives; private-sector bonds, bills, notes, stocks, and other securities or derivatives; communication licenses and spectrum rights; clearing, relocation or other rights concerning encumbrances of spectrum licenses; electric power and other commodity items; rights for terminal, entry, exit or transmission capacities or other rights in gas pipeline systems; airport landing rights; emission allowances and pollution permits; and other goods, services, objects, items or other property, tangible or intangible. It may also be used for option contracts on any of the above. It may be used in initial public offerings, secondary offerings, and in secondary or resale markets.

The network used, if any, can be any system capable of providing the necessary communication to/from BIP, BT, and AT. The network may be a local or wide area network such as, for example, ethernet, token ring, the Internet, the World Wide Web, the information superhighway, an intranet or a virtual private network, or alternatively a telephone system, either private or public, a facsimile system, an electronic mail system, or a wireless communications system.

DETAILED DESCRIPTION OF PREFERRED EMBODIMENTS

The drawings of FIGS. 1–4 of my prior patent U.S. Pat. No. 6,026,383 and of FIGS. 1–12 of my prior patent U.S. Pat. No. 5,905,975, and the associated text of each, provide a general superstructure for the present auction method and system, especially as it relates to the computer implementation thereof. Moreover, the terminology established in the previous applications will be relied upon as needed. The following description will detail the flow of the novel features of the preferred embodiments of the present method and system for an efficient dynamic multi-unit auction.

Figure 1:
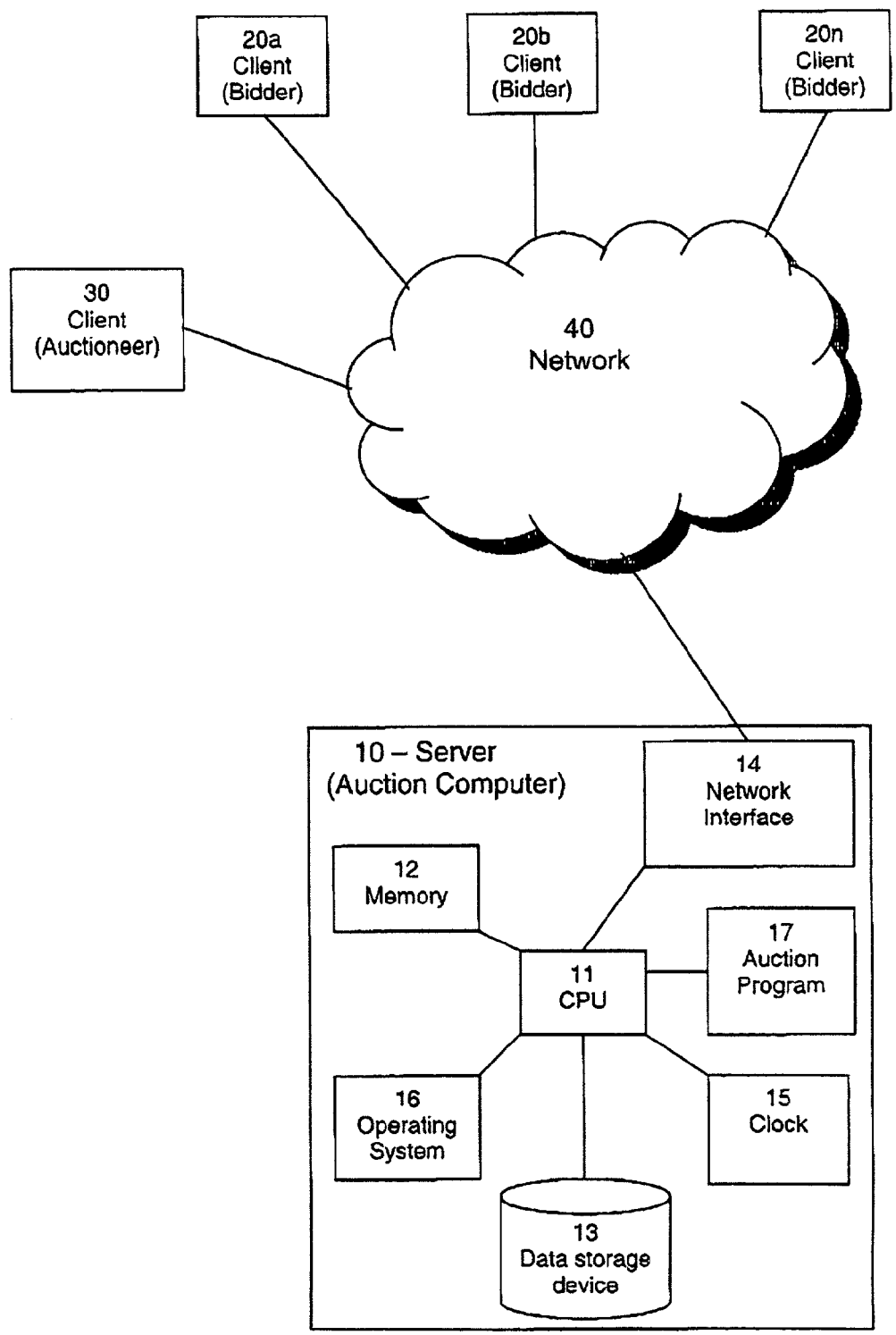
FIG. 1 is a graphical depiction of the architecture of an exemplary client-server computer system in accordance with an embodiment of the invention.

Before describing the auction process in detail, reference is made to FIG. 1 to describe the architecture of an exemplary computer system in accordance with an embodiment of the present invention. In the graphical depiction of FIG. 1, the computer system consists of multiple clients 20a–n and 30 communicating with the server 10 over a network 40. The clients 20a–n are the bidders, the client 30 is the auctioneer, and the server 10 is the auction computer. The server 10 consists of a CPU 11, memory 12, a data storage device 13, a communications interface 14, a clock 15, an operating system 16, and an auction program 17.

Figure 2:
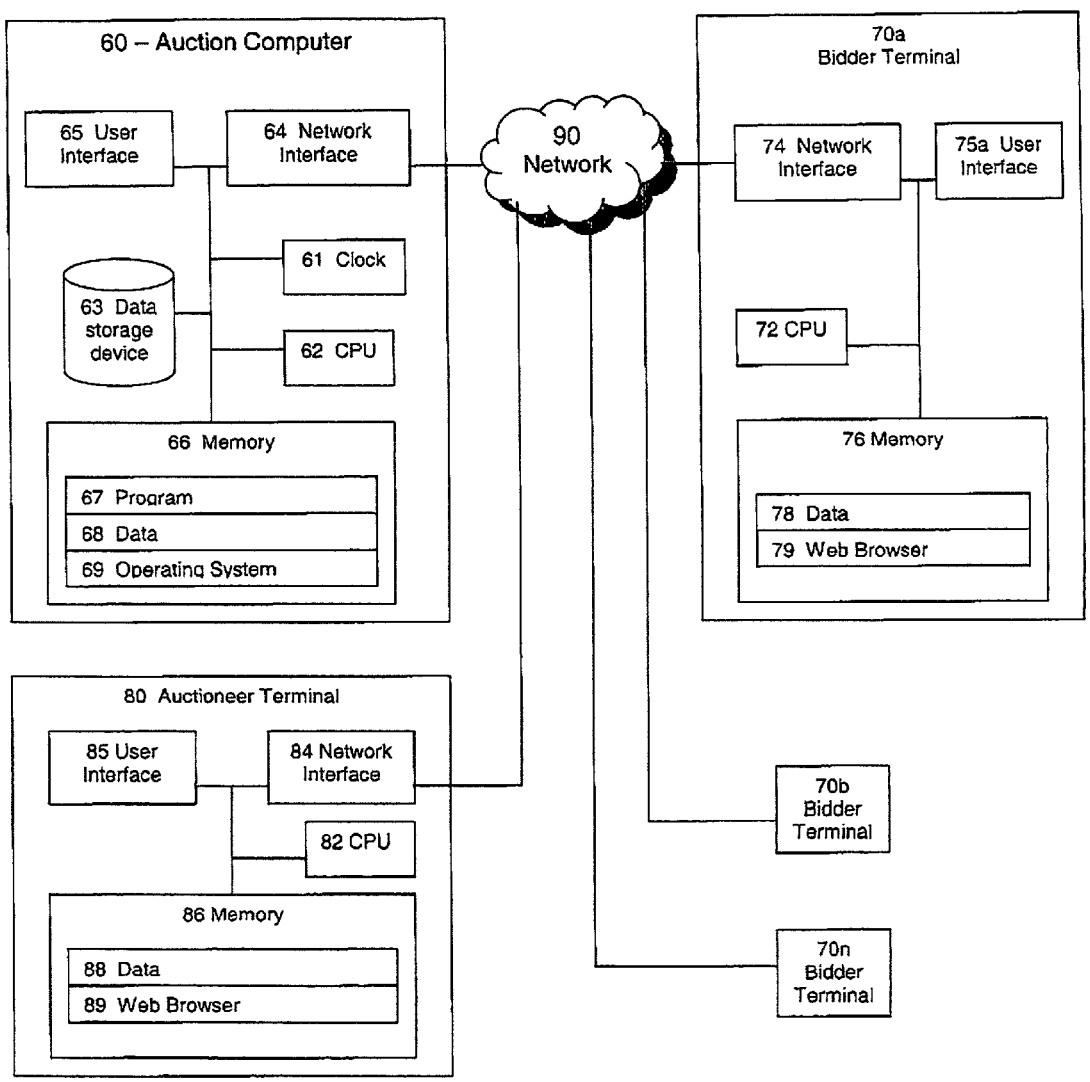
FIG. 2 is another graphical depiction of an exemplary computer system in accordance with an embodiment of the invention.

FIG. 2 is another graphical depiction of an exemplary computer system in accordance with an embodiment of the present invention. The auction system of FIG. 2 includes an auction computer 60 (sometimes also referred to as a Bidding Information Processor or BIP), a plurality of user systems 70a, 70b and so on (sometimes also referred to as Bidder Terminal or BT), each user system 70a–n representing an individual bidder, and a user system 80 (sometimes also referred to as an Auctioneer Terminal or AT). The systems 60, 70a–n, and 80 communicate over a network 90. The network represents any system capable of providing the necessary communication to/from BIP, BT, and AT. The network may be a local or wide area network such as, for example, ethernet, token ring, the Internet, the World Wide Web, the information superhighway, an intranet or a virtual private network, or alternatively a telephone system, either private or public, a facsimile system, an electronic mail system, or a wireless communications system. Each of the systems 60, 70a–n, and 80 may include a typical user interface 65, 75a–n, 85 for input/output which may include a conventional keyboard, display, and other input/output devices. Within each of the systems, the user interface (65, 75a–n, 85) is coupled to a network interface (64, 74a–n, 84), which in turn communicates via the network 90. Both the user interface and network interface connect, at each system, to a CPU (62, 72a–n, 82). Each system includes a memory (66, 76a–n, 86). The BIP 60 also includes a clock 61 and a data storage device 63, which will ordinarily contain a database. (However, in some embodiments the database might instead be stored in memory 66.) The memory 66 of the BIP 60 can further be broken down into a program 67, data 68 and an operating system 69. The memory (76a–n, 86) of the BT's 70a–n and the AT 80 may include a web browser (for example, Internet Explorer or Netscape) (79, 89) or other general-purpose software, but not necessarily any computer program specific to the auction process. In each system the CPU (62, 72a–n, 82) represents a source of intelligence when executing instructions from the memory (66, 76a–n, 86) so that appropriate input/output operations via the user interface and the network interface take place as is conventional in the art. The particular steps used in implementing the inventive auction system are described in more detail below. In one embodiment, each of the systems are personal computers or workstations.

Figure 3:
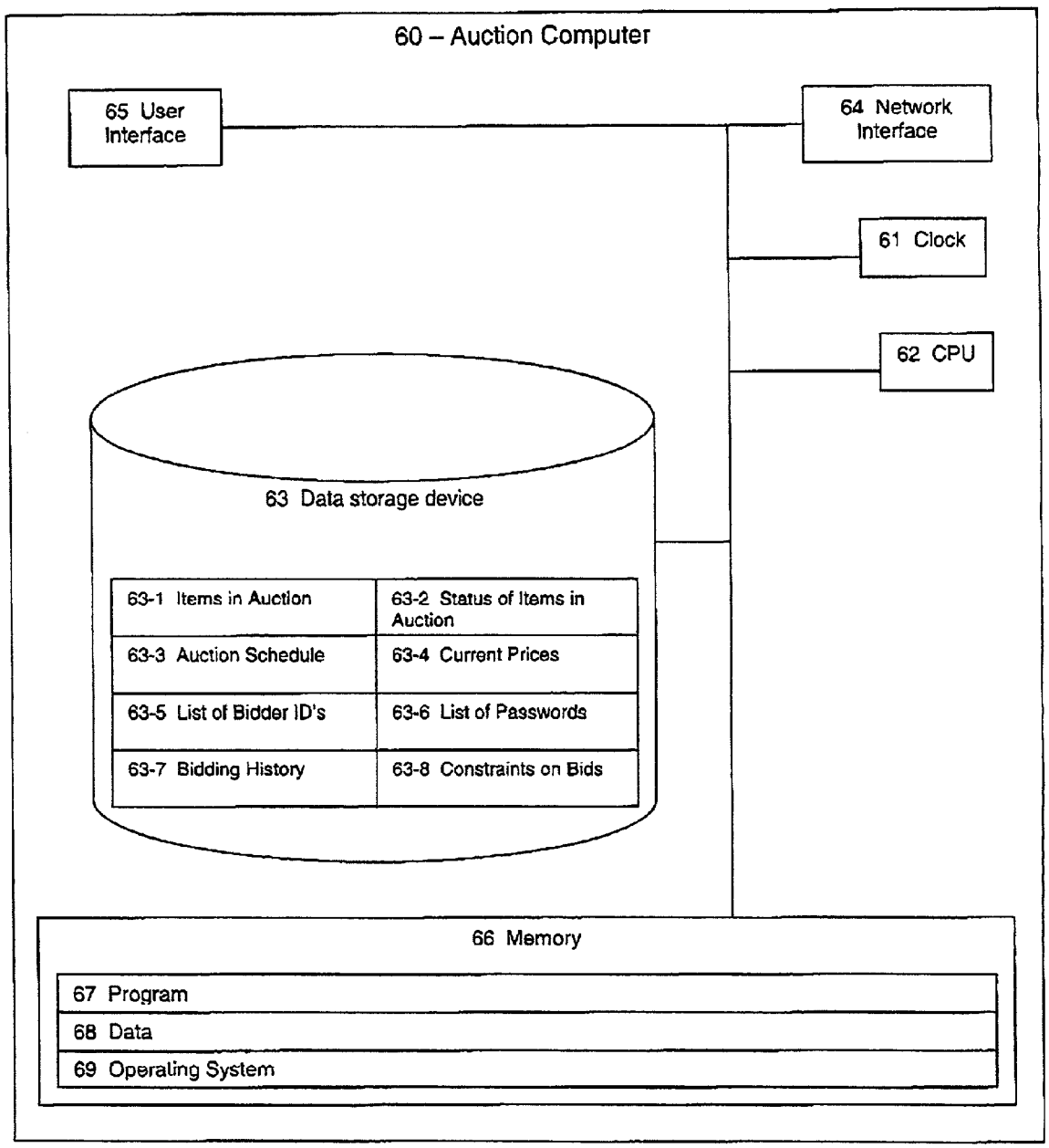
FIG. 3 is a detail of one element of the computer system of FIG. 2.

FIG. 3 is a more detailed illustration of an exemplary BIP 60 showing details of the database. As discussed for FIG. 2, the database is ordinarily stored on a data storage device 63, although in some embodiments it might instead be stored in memory 66. As depicted in FIG. 3, the database includes provision for creating, storing, and retrieving records representing Items in the Auction 63-1, Status of the Items in the Auction 63-2, Auction Schedule 63-3, Current Price(s) 63-4, List of Bidder ID's 63-5, List of Passwords 63-6, Bidding History 63-7, and Constraints on Bids 63-8. The particular set of data required for any particular auction and the format of that datum or data (such as scalar, vector, list, etc.) is more particularly specified by the detailed description of that auction.

Embodiments Concerned with Heterogeneous Commodities

Many of the most useful embodiments of the present invention apply in situations where an entity wishes to sell or buy heterogeneous items or commodities. A type of item is defined so that two units of the same type are identical items or close substitutes, while two units of different types exhibit significant differences in time, location or any other product characteristics. Typically, there are multiple units of each type of item. Items or commodities are defined to be heterogeneous when there are two or more types of items.

The various embodiments of the present invention tend to be the most useful when the items are heterogeneous (so that the system and method for a dynamic auction of homogeneous commodities, described in U.S. Pat. No. 6,026,383, does not apply), but nevertheless there is some connection or relation between the different types of items (so that there is good reason to sell or buy the different types of commodities in a single auction process). Examples of heterogeneous items for which there may be significant commercial possibilities for embodiments of the present invention include the following:

Treasury bonds or other securities: For example, a government or central bank may wish to auction 3-month, 6-month and 12-month Treasury securities together. Thus, there are three types of heterogeneous items.

Electricity contracts: An electric generating company may wish to simultaneously auction some forward contracts or options contracts for base-load and peak-load electricity generation, with durations of 2 months, 3 months, 6 months, 12 months, 24 months and 36 months, respectively. Thus, there are 2×6=12 types of heterogeneous commodities.

Entry capacity into a gas pipeline system: A gas pipeline company wishes to simultaneously auction the capacity to enter the gas pipeline system at five geographically-dispersed terminals. Thus, there are five types of heterogeneous commodities.

Two or more heterogeneous consumer commodities (e.g., oranges and grapefruits).

In what follows, we will assume that m (m≧1) types of items are being auctioned, and that there are n (n≧1) bidders participating in the auction. An auction in accordance with an embodiment of the present invention proceeds as follows. First, the auctioneer (i.e., the auctioneer terminal) determines a starting price vector, $(P_1, \ldots, P_m)$, and transmits it to the bidding information processor, which in turn transmits it to bidders (i.e., bidder terminals). Second, a bidder responds with a bid vector indicating the quantity of each respective type of item that the bidder wishes to transact at the current price vector. Let the bidders be superscripted by i, where (i=1, . . . , n) The bid vector for bidder i is denoted by $(Q_1^i, \ldots, Q_m^i)$. The following definitions are helpful in describing the process associated with a first embodiment of the present invention.

DEFINITIONS

The available quantities $(\overline{Q}_1, \ldots, \overline{Q}_m)$ refer, in the case of an auction to sell, to the quantities of the m respective types of items offered to be sold in the auction or, in the case of an auction to buy (i.e., a procurement auction or a "reverse auction"), to the quantities of the m respective types of items offered to be bought in the auction. Optionally, the available quantities may be allowed to depend on the prices, or otherwise be contingent on the progress of the auction.

The current prices comprise a vector, $(P_1, \ldots, P_m)$, whose components represent the prices for the m respective types of items.

The current bid of bidder i comprises a vector, $(Q_1^i, \ldots, Q_m^i)$, whose components represent the quantities that bidder i is willing to buy (in the case of an auction to sell) or to sell (in the case of an auction to buy) at the current prices for the m respective types of items.

The current bids comprise the collection of vectors, $\{Q_1^i, \ldots, Q_m^i\}_{i=1}^n$, consisting of the current bid of bidder i for every bidder (i=1, . . . , n) in the auction.

The bidding history comprises the current prices and the current bids associated with the present time and all earlier times in the current auction.

A clock auction is a dynamic auction procedure whereby: the auctioneer announces the current prices to bidders; the bidders respond with current bids; the auctioneer determines whether the auction should continue based on the bidding history; the auctioneer updates the current prices based on the bidding history and the process repeats, if it is determined that the auction should continue; and the auctioneer allocates the items among the bidders and assesses payments among the bidders based on the bidding history, if it is determined that the auction should not continue.

Observe that a "clock auction" differs from a standard ascending-bid electronic auction in the following important sense. In standard ascending-bid electronic auctions—such as in the Federal Communications Commission auctions for radio communications spectrum or in eBay Auctions—the bidders name prices (and, perhaps also, quantities) that they propose to pay for the items being auctioned, in an iterative process. In a standard clock auction, the auctioneer sets the pace for price increases, and bidders respond only with quantities in an iterative process. (However, in the discussion of Intra-Round Bids, below, it will be seen that there still may be a role for bidders naming prices—to a limited extent—in a clock auction.)

Figure 4:
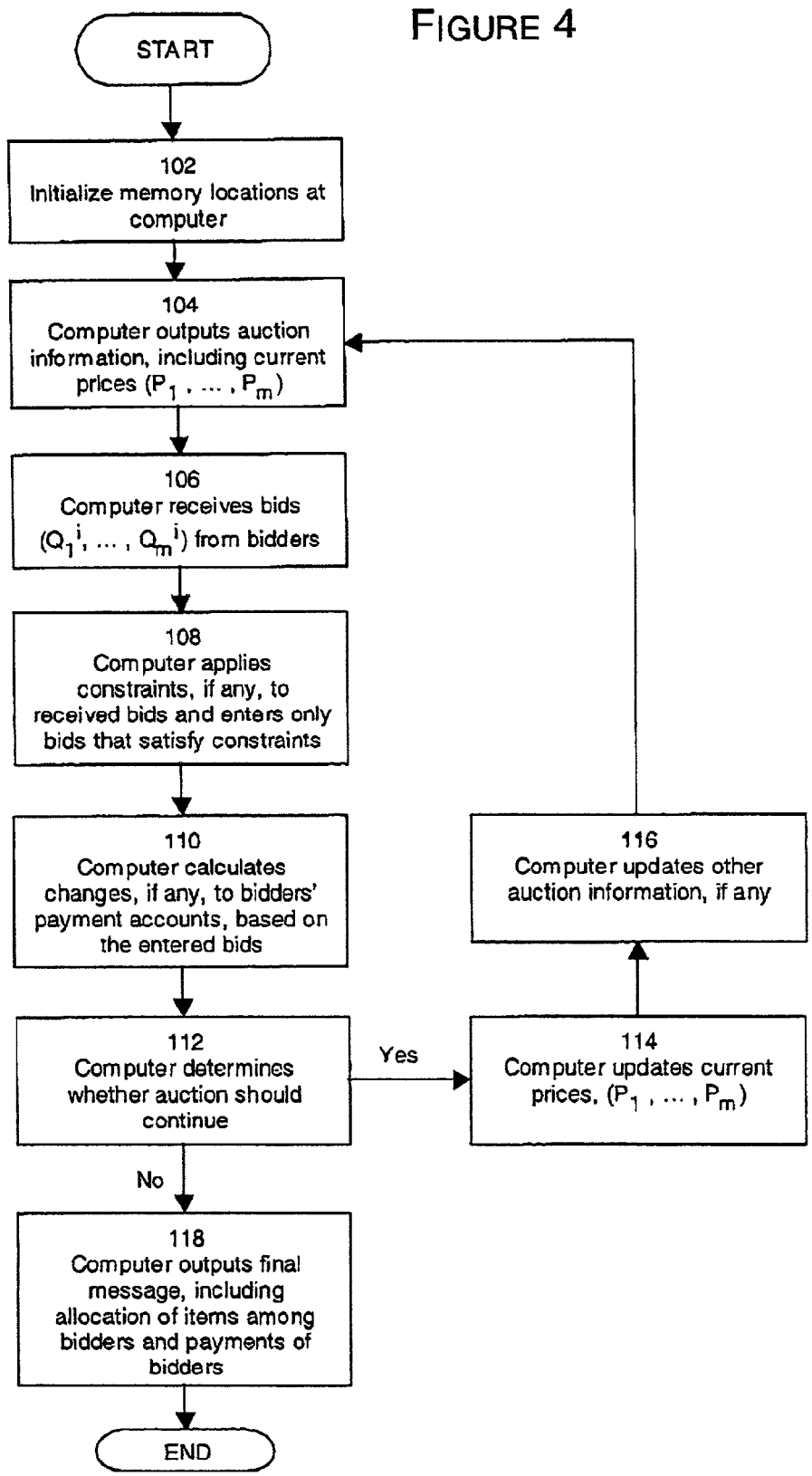
FIG. 4 is a flow diagram of an auction process in accordance with one embodiment of the invention.

FIG. 4 is a flow diagram of a clock auction in accordance with one embodiment of the present invention. The process starts with step 102, in which memory locations of a computer are initialized. In one preferred embodiment, the appropriate memory locations of the bidding information processor (auction computer) are initialized with information such as the items in the auction, the available quantity of each type of item in the auction, the initial price vector, the auction schedule, a list of bidder ID's, and a list of passwords. In step 104, a computer outputs auction information, including the starting price vector $(P_1, \ldots, P_m)$. In one preferred embodiment, the bidding information processor outputs the auction information through its network interface and transmits it via the network. The bidder terminals then receive the auction information through their network interfaces and display the information to bidders through their user interfaces. In step 106, a computer receives bids $(Q_1^i, \ldots, Q_m^i)$ from bidders. In one preferred embodiment, a bidder inputs his bids through the user interface of the bidder terminal, which then outputs the auction information through its network interface and transmits it via the network. The bidding information processor then receives the bids through its network interface for use in the next step. In step 108, a computer applies constraints, if any, to the received bids, and enters only those bids that satisfy said constraints. This process is illustrated in greater detail in FIGS. 6a and 6b. In one preferred embodiment, the constraints are applied at the bidding information processor, although they may also easily be applied at the bidder terminals. In step 110, a computer calculates changes, if any, to bidders' payment accounts, based on the entered bids. This process is shown in more detail in FIG. 5. In one preferred embodiment, the changes to bidders' payment accounts are calculated at the bidding information processor. In step 112, a computer determines whether the auction should continue. An exemplary process of step 112 is illustrated in greater detail in FIG. 7. In one preferred embodiment, this determination occurs at the bidding information processor.

If the auction should continue, the process goes to step 114, in which a computer updates the price vector $(P_1, \ldots, P_m)$, and step 116, in which a computer updates other auction information, if any. An exemplary process of step 114 is illustrated in greater detail in FIG. 8. In one preferred embodiment, the bidding information processor automatically generates a suggested revised price vector, outputs the suggested revised price vector through its network interface, and transmits it via the network. The auctioneer terminal then receives the suggested revised price vector through its network interface and displays it to the auctioneer through its user interface. The auctioneer either approves or modifies the revised price vector through the user interface of the auctioneer terminal, which then outputs the revised price vector through its network interface and transmits it via the network. The bidding information processor then receives the revised price vector through its network interface for use in subsequent steps. The process then loops to step 104.

If the auction should not continue, the process goes to step 118, in which a computer outputs a final message, including the allocation of items among bidders and the payments of the bidders. In one preferred embodiment, the bidding information processor takes the allocation of items among bidders to be their final bids and takes the payments of the bidders to be the final amounts in their payment accounts, and outputs the allocation and payment outcome through its network interface and transmits it via the network. The bidder terminals and auctioneer terminal then receive the allocation and payment outcome through their network interfaces and display the information to bidders and the auctioneer through their user interfaces. The process then ends.

Figure 5:
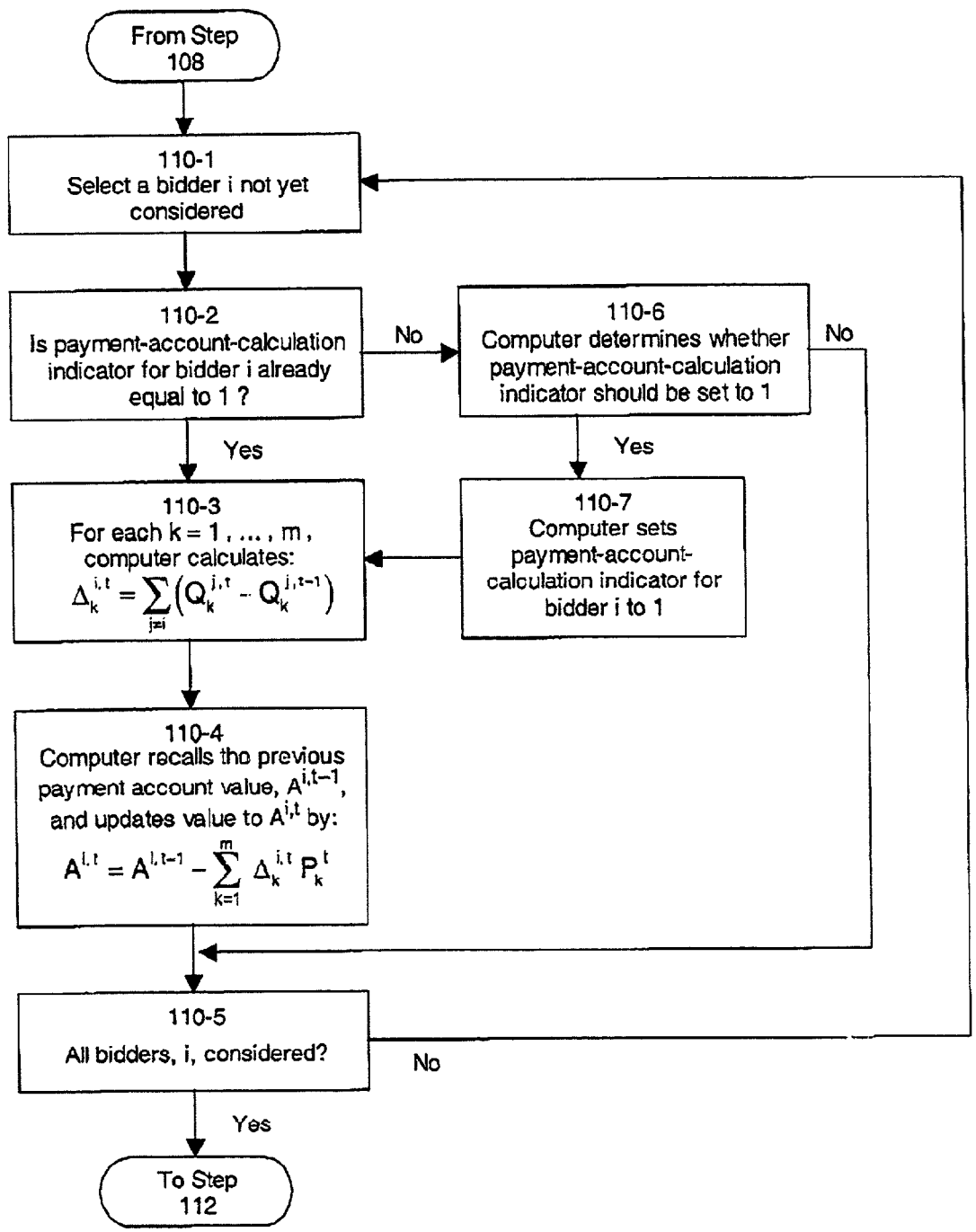
FIG. 5 is a more detailed flow diagram illustrating, in more detail, an element of the diagram of FIG. 4.

Embodiments Concerned with an Efficient Dynamic Auction for Heterogeneous Commodities FIG. 5 is a flow diagram of the subprocess of step 110 in which a computer calculates changes, if any, to bidders' payment accounts. The embodiment of the present invention shown in FIG. 5 makes bidders' payments as independent as possible of their own bids, and so a bidder has little incentive to manipulate the auction process even if the bidder possesses market power. An auction that utilizes the process of FIG. 5 will henceforth be referred to as the "Efficient Dynamic Auction for Heterogeneous Commodities."

While the theoretical properties of the Efficient Dynamic Auction for Heterogeneous Commodities are not yet fully developed, and I do not wish to be bound by the result that I now state, it is helpful in pondering its usefulness to consider the following remarkable result, which I have proved elsewhere:

THEOREM. Suppose that bidders have purely private values for the commodities in the auction, and suppose that their utility functions are concave in the commodities and quasi-linear in money. For any initial price vector and for any initial value in bidders' payment accounts:

(i) sincere bidding by every bidder is a subgame perfect equilibrium of the Efficient Dynamic Auction for Heterogeneous Commodities; and (ii) with sincere bidding, the price vector converges to a Walrasian equilibrium price, and hence the allocation of commodities attains full economic efficiency.

Unlike auction procedures in the prior art, the present invention will tend to yield fully-efficient outcomes, if bidders bid optimally.

While the previous and following description of the Efficient Dynamic Auction for Heterogeneous Commodities is framed largely in terms of regular auctions to sell (where bidders are buyers), the invention is equally applicable for reverse or procurement auctions to buy (where bidders are sellers). For the sake of brevity, this specification will not run through the process a second time with the roles of selling and buying reversed, but it should be clear to anybody skilled in the art that the technology can be equally used in both situations.

FIG. 5 is a flow diagram of a subprocess of step 110. It begins with step 110-1, in which a bidder i who has not yet been considered is selected. In step 110-2, a "payment-account-calculation indicator" for bidder i is examined. This indicator is set equal to 1 if changes to bidder i's payment account are supposed to be calculated at this step of the auction; and this indicator is set equal to 0, otherwise. In the preferred embodiment of the present invention that yields the theorem stated above, this indicator is always set equal to 1 (and so the steps 110-3 and 110-4 are always performed). However, in other embodiments of the present invention, the payment-account-calculation indicator is initially set equal to 0 and is changed to 1 only when specific criteria are satisfied, or never at all.

If the payment-account-calculation index is already equal to 1, the process goes to step 110-3. In step 110-3, for each $k=1, \ldots, m$, a computer calculates:

$$\Delta_k^{i,t} = \sum_{j \neq i} (Q_k^{j,t} - Q_k^{j,t-1})$$

That is, $\Delta_k^{i,t}$ is the change in the aggregate demands of bidder i's opponents for items of type k, between the previous bids and the current bids. $\Delta_k^{i,t}$ is calculated as follows: for each type k of item in the auction and for each opposing bidder j≠i, the computer takes the difference between bidder j's demand at time t for items of type k and bidder j's demand at time t−1 for items of type k. Summing this, over all opposing bidders j≠i, yields $\Delta_k^{i,t}$.

The process then proceeds to step 110-4, in which the payment account value for bidder i is updated. In the preferred embodiment of the present invention that yields the theorem stated above, the payment account value for bidder i can initially be set to any arbitrary constant. One initial value that has desirable theoretical properties is:

$$\sum_{k=1}^{m} P_k^0 \left( \overline{Q}_k - \sum_{j \neq i} Q_k^{j,0} \right),$$

where $P_k^0$ denotes the initial price for the commodity of type k, and $Q_k^{j,0}$ is opposing bidder j's initial demand for the commodity of type k. After the initial time that step 110-4 is executed for bidder i, the previous payment account value, denoted $A^{i,t-1}$, is recalled. An updated payment account value, denoted $A^{i,t}$, is computed by the following equation:

$$A^{i,t} = A^{i,t-1} - \sum_{k=1}^{m} \Delta_k^{i,t} P_k^t.$$

This equation for updating the payment account value has the following interpretation: bidder i is credited with the quantity $-\Delta_k^{i,t}$ of items of type k. Effectively, every time bidder i's opponents change their aggregate quantity demanded by $-\Delta_k^{i,t}$ units, the auction process implicitly assumes that $-\Delta_k^{i,t}$ units will be awarded to bidder i, and the auction process charges bidder i the current price vector of $P_k^t$ for each of these units. (Moreover, if ever bidder i's opponents increase their aggregate quantity demanded, so that $\Delta_k^{i,t}$ is a positive number, then bidder i is debited with the quantity $\Delta_k^{i,t}$ of items of type k. The auction process implicitly then assumes that $\Delta_k^{i,t}$ units will be taken away from bidder i, and the auction process pays bidder i the current price vector of $P_k^t$ for each of these units.) It is not necessary that literally the current price vector, $P_k^t$, is used in step 110-4. In other embodiments, the previous price vector, $P_k^{t-1}$, or some price in the interval between $P_k^{t-1}$ and $P_k^t$ is used. The process then proceeds to step 110-5, where it is determined whether all bidders have been considered. If not, the process loops back to step 110-1. If all bidders have been considered, the process goes to step 112 of FIG. 4.

If the payment-account-calculation indicator for bidder i is not equal to 1, the process goes to step 110-6. In step 110-6, it is determined whether the payment-account-calculation indicator should be set equal to 1. As stated earlier, in the preferred embodiment of the present invention that yields the theorem stated above, this step is never reached, as the indicator is always set equal to 1. However, another exemplary embodiment of the present invention would only have the indicator set equal to 1 for bidder i when the aggregate demand of bidder i's opponents drops to less than the available quantity. Yet another exemplary embodiment of the present invention would only have the indicator set equal to 1 when the aggregate demand of all bidders drops to less than a predetermined percentage of the available quantity, for example when the aggregate demand of all bidders first becomes less than 120% of the available quantity.

If the payment-account-calculation indicator for bidder i should be set equal to 1, the process goes to step 110-7, where the indicator for bidder i is set equal to 1. The process then continues with steps 110-3 and 110-4, where changes to bidder i's payment account value are calculated. If the payment-account-calculation indicator for bidder i should not be set equal to 1, the process loops directly to step 110-5 without changing the payment account value for bidder i.

It is useful for understanding the Efficient Dynamic Auction for Heterogeneous Commodities to, at this point, work through an example of the auction process where there are two types of items (i.e., m=2). Real-world examples fitting this description may include the sale of three-month and six-month Treasury bills, or the sale of base-load and peak-load electricity. However, we will generically refer to them as commodity A and commodity B. Suppose that the supply vector is (10,8), i.e., commodities A and B are available in supplies of 10 and 8, respectively, and suppose that there are n=3 bidders. The auctioneer initially announces a price vector of $p_1$=(3,4), and subsequently adjusts the price vector to $P_2$=(4,5), $p_3$=(5,7), $p_4$=(6,7), and finally $p_5$=(7,8). The bidders' reports of quantities demanded at these price vectors are shown in Table 1:

TABLE 1

Price and Quantity Vectors for Illustrative Example with m = 2

| Price Vector | Bidder 1 | Bidder 2 | Bidder 3 |
| --- | --- | --- | --- |
| $p_1$ = (3,4) | (5,4) | (5,4) | (5,4) |
| $p_2$ = (4,5) | (4,4) | (5,4) | (4,3) |
| $p_3$ = (5,7) | (4,3) | (4,4) | (4,1) |
| $p_4$ = (6,7) | (4,3) | (4,4) | (3,2) |
| $p_5$ = (7,8) | (4,2) | (3,4) | (3,2) |

The crediting of units to bidders occurs as follows. First, consider Bidder 1. When the price vector advances from $p_1$=(3,4) to $p_2$=(4,5), the sum of the quantity vectors demanded by Bidder 1's opponents decreases from (10,8) to (9,7). Thus, 1 unit of commodity A and 1 unit of commodity B can be thought of as becoming available to Bidder 1 at the current price of $p_2$=(4,5). The auction algorithm takes this literally, by crediting 1 unit of commodity A at a price of 4, and 1 unit of commodity B at a price of 5, to Bidder 1. Next, consider Bidder 2. When the price vector advances from $p_1$=(3,4) to $p_2$=(4,5), the sum of the quantity vectors demanded by Bidder 2's opponents decreases from (10,8) to (8,7). Thus, 2 units of commodity A and 1 unit of commodity B can be thought of as becoming available to Bidder 2 at the current price. The auction algorithm takes this literally, by crediting 2 units of commodity A at a price of 4, and 1 unit of commodity B at a price of 5, to Bidder 2. Finally, consider Bidder 3. When the price vector advances from $p_1$=(3,4) to $p_2$=(4,5), the sum of the quantity vectors demanded by Bidder 3's opponents decreases from (10,8) to (9,8). Thus, 1 unit of commodity A and 0 units of commodity B can be thought of as becoming available to Bidder 3 at the current price. Again, the auction algorithm takes this literally, by crediting 1 unit of commodity A at a price of 4, and 0 units of commodity B at a price of 5, to Bidder 3.

The process continues as the price vector advances. One interesting moment occurs when the price advances from $p_3=(5,7)$ to $p_4=(6,7)$. Observe that Bidder 3's demand vector changes from (4,1) to (3,2), while the other bidders' demand vectors remain constant. In particular, Bidder 3's demand for commodity B increases, meaning that 1 fewer unit of commodity B remains available for Bidders 1 and 2. Consequently, the auction algorithm needs to take this literally, by debiting 1 unit of commodity B at the current price of 7 from each of Bidders 2 and 3.

The entire progression of units credited and debited-and the associated progression of changes to the bidders' payment accounts-is summarized for this example in Table 2:

TABLE 2

Credits and Debits for Illustrative Example with m = 2

| Price Vector | Bidder 1 | Bidder 2 | Bidder 3 |
|---|---|---|---|
| $P_1 =$ (3,4) | Initialization | Initialization | Initialization |
| $P_2 =$ (4,5) | 1 unit of A credited at 4 | 2 units of A credited at 4 | 1 unit of A credited at 4 |
| | 1 unit of B credited at 5 | 1 unit of B credited at 5 | 0 units of B credited at 5 |
| | Cumulative payment = 9 | Cumulative payment = 13 | Cumulative payment = 4 |
| $P_3 =$ (5,7) | 1 unit of A credited at 5 | 0 units of A credited at 5 | 1 unit of A credited at 5 |
| | 2 units of B credited at 7 | 3 units of B credited at 7 | 1 unit of B credited at 7 |
| | Cumulative payment = 28 | Cumulative payment = 34 | Cumulative payment = 16 |
| $P_4 =$ (6,7) | 1 unit of A credited at 6 | 1 unit of A credited at 6 | 0 units of A credited at 6 |
| | 1 unit of B debited at 7 | 1 unit of B debited at 7 | 0 units of B credited at 7 |
| | Cumulative payment = 27 | Cumulative payment = 33 | Cumulative payment = 16 |
| $P_5 =$ (7,8) | 1 unit of A credited at 7 | 0 units of A credited at 7 | 1 unit of A credited at 7 |
| | 0 units of B credited at 8 | 1 unit of B credited at 8 | 1 unit of B credited at 8 |
| | Cumulative payment = 34 | Cumulative payment = 41 | Cumulative payment = 31 |

At $p_5=(7,8)$, supply and demand are now in balance for both commodities. Thus, $p_5$ becomes the final price. Bidders 1, 2 and 3 are allocated the quantity vectors of (4,2), (3,4) and (3,2), respectively, that they demanded at the final price. In addition, Bidders 1, 2 and 3 are charged payments of 34, 41 and 31, respectively, the amounts accrued in their payment accounts at the end of the auction. Since many of the credits and debits in the sequence occurred at earlier prices, bidders' payments do not generally equal their final quantity vectors evaluated at the final prices. Rather, if the procedure described above is performed along a continuous price path, the bidders' payments are related to those derived from a Vickrey auction (also known as a Vickrey-Clarke-Groves mechanism). I develop this result elsewhere.

Embodiments of the Invention Concerned with Applying Constraints to Bids

Figure 6A:
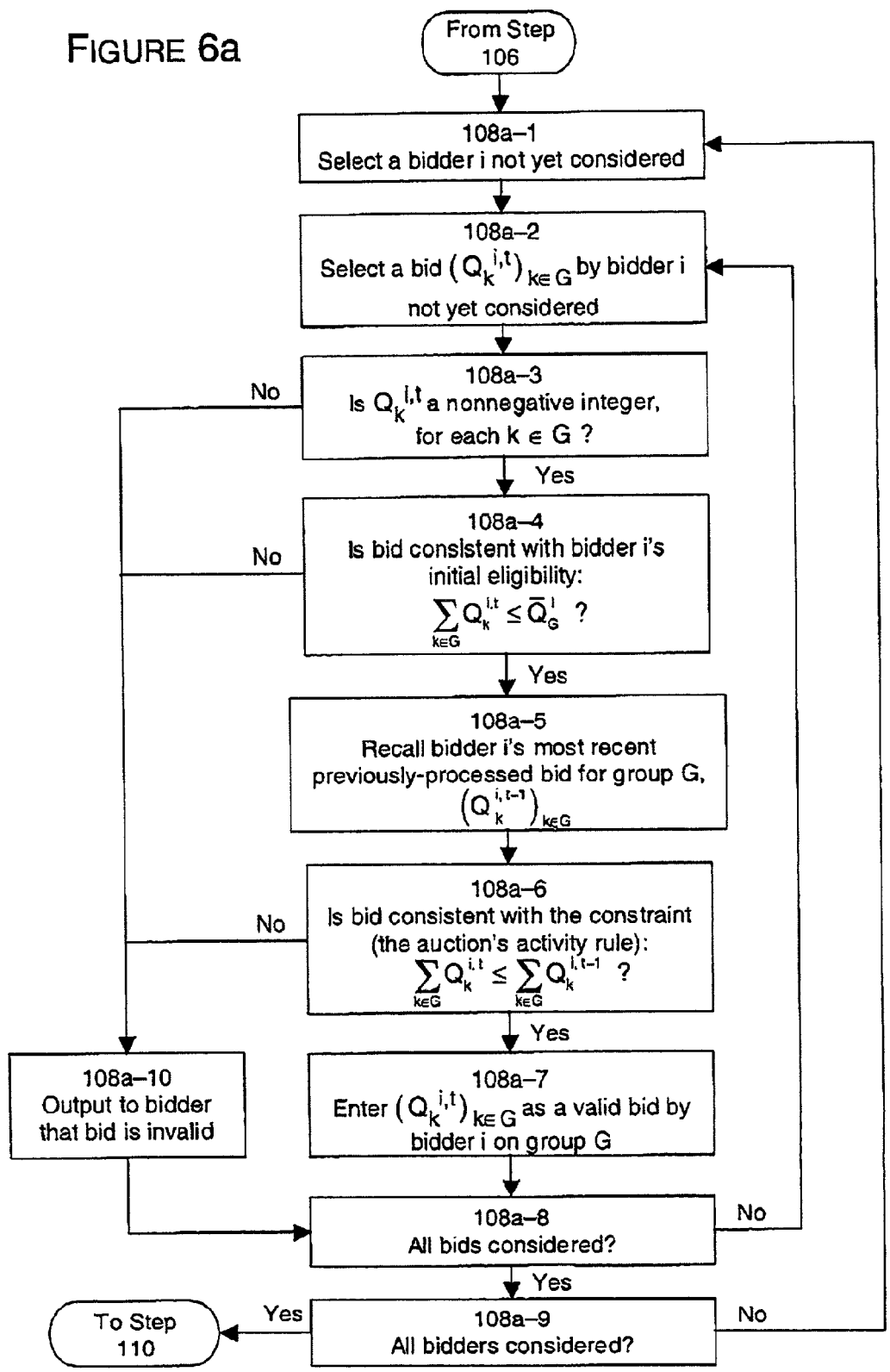
FIGS. 6a and 6b are more detailed flow diagrams illustrating, in more detail, elements of the diagram of FIG. 4.
Figure 6B:
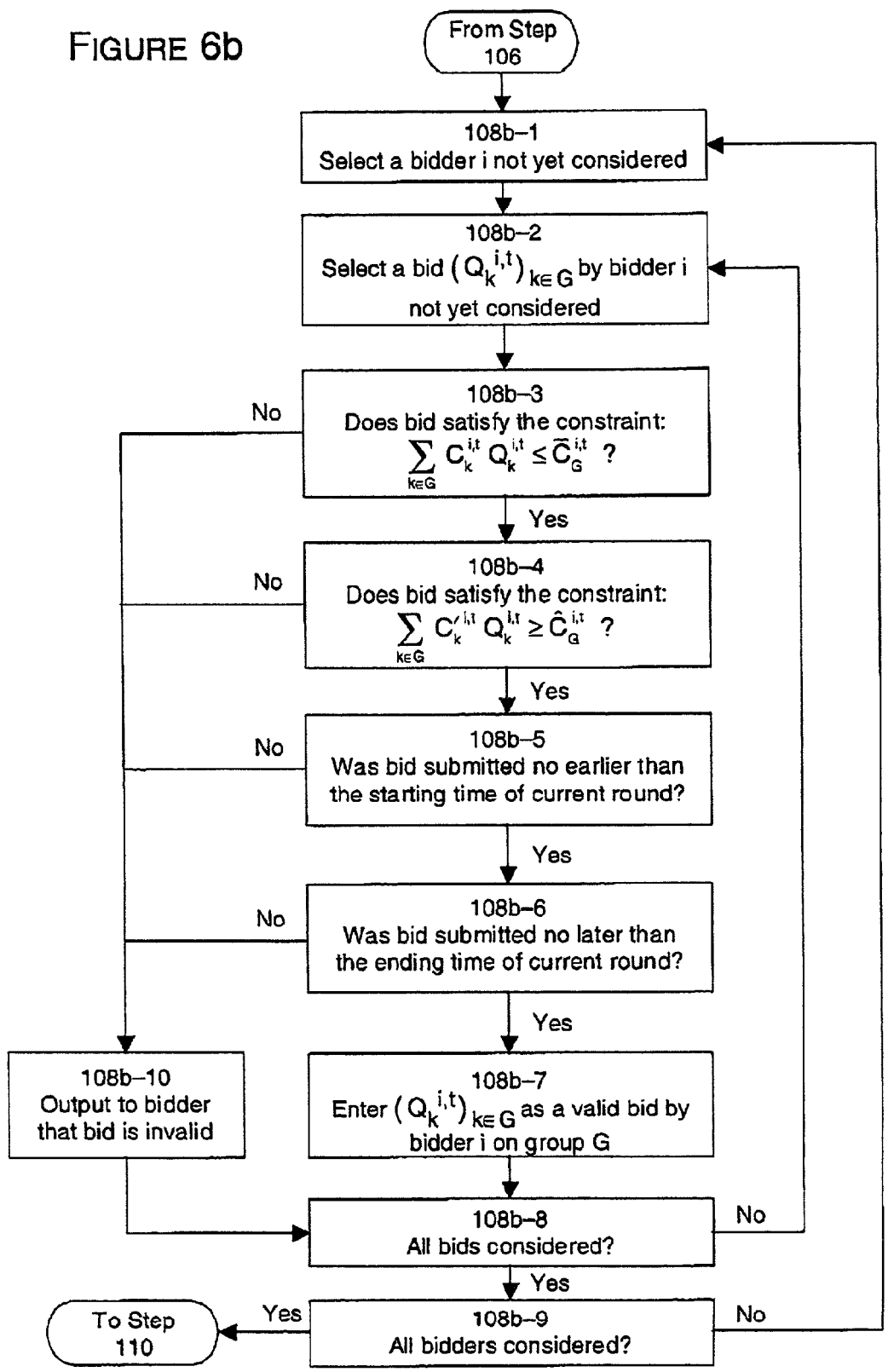

FIGS. 6a and 6b are flow diagrams of two exemplary subprocesses of step 108. The process of FIG. 6a begins with step 108a-1, in which a bidder i who has not yet been considered is selected. In step 108a-2, a bid $(Q_k^{i,t})_{k \in G}$ by bidder i which has not yet been considered is selected. G is defined to be a group of item types. G is a nonempty subset of $\{1, \ldots, m\}$, the set of all item types. In step 108a-3, it is checked whether each quantity $Q_k^{i,t}$ in the selected bid is a nonnegative integer. If each component of the bid is a nonnegative integer, the process goes to step 108a-4. In step 108a-4, it is checked whether the selected bid is consistent with bidder i's initial eligibility, that is, whether:

$$\sum_{k \in G} Q_k^{i,t} \leq \overline{Q}_G^i,$$

where bidder i's initial eligibility, $\overline{Q}_G^i$, for group G may, for example, be determined by the level of financial guarantee posted by bidder i. If the selected bid is consistent with bidder i's initial eligibility, the process goes to step 108a-5, where bidder i's most recent previously-processed bid for group G, denoted $(Q_k^{i,t-1})_{k \in G}$, is recalled. In step 108a-6, it is checked whether the selected bid is consistent with the auction's activity rule, that is, whether the constraint:

$$\sum_{k \in G} Q_k^{i,t} \leq \sum_{k \in G} Q_k^{i,t-1},$$

is satisfied. If it is, the process continues to step 108a-7, where the selected bid $(Q_k^{i,t})_{k \in G}$ is entered as a valid bid by bidder i on group G. Optionally, bidder i is sent a message confirming to him that the bid is valid. The process then goes to step 108a-8, where it is determined whether all bids by bidder i have been considered. If not, the process loops back to step 108a-2. If all bids by bidder i have been considered, the process continues to step 108a-9, where it is determined whether all bidders have been considered. If not, the process loops back to step 108a-1. If all bidders have been considered, the process goes to step 110 of FIG. 4.

If the selected bid fails any of the checks at steps 108a-3, 108a-4 or 108a-6, the process instead goes to step 108a-10, where a message is outputted to bidder i that the selected bid is invalid. The selected bid then is not entered as a valid bid. The process then goes to step 108a-8, where it is determined whether all bids by bidder i have been considered. If not, the process loops back to step 108a-2. If all bids by bidder i have been considered, the process continues to step 108a-9, where it is determined whether all bidders have been considered. If not, the process loops back to step 108a-1. If all bidders have been considered, the process goes to step 110 of FIG. 4.

The process of FIG. 6b begins with step 108b-1, in which a bidder i who has not yet been considered is selected. In step 108b-2, a bid $(Q_k^{i,t})_{k \in G}$ by bidder i which has not yet been considered is selected. In step 108b-3, it is checked whether each quantity $Q_k^{i,t}$ in the selected bid satisfies the constraint:

$$\sum_{k \in G} C_k^{i,t} Q_k^{i,t} \leq \overline{C}_G^{i,t},$$

where $C_k^{i,t}$ and $\overline{C}_G^{i,t}$ are arbitrary constants. If the constraint of step 108b-3 is satisfied, the process goes to step 108b-4. In step 108b-4, it is checked whether each quantity $Q_k^{i,t}$ in the selected bid satisfies the constraint:

$$\sum_{k \in G} C'^{i,t}_k Q^{i,t}_k \ge \hat{C}^{i,t}_G,$$

where $C'^{i,t}_k$ and $\hat{C}^{i,t}_G$ are arbitrary constants. If the constraint of step 108b-4 is satisfied, the process goes to step 108b-5, where it is checked whether the selected bid was submitted at a time no earlier than the starting time of the current round. If it was, the process goes to step 108b-6, where it is checked whether the selected bid was submitted at a time no later than the ending time of the current round. If it was, the process continues to step 108b-7, where the selected bid $(Q^{i,t}_k)_{k \in G}$ is entered as a valid bid by bidder i on group G. Optionally, bidder i is sent a message confirming to him that the bid is valid. The process then goes to step 108b-8, where it is determined whether all bids by bidder i have been considered. If not, the process loops back to step 108b-2. If all bids by bidder i have been considered, the process continues to step 108b-9, where it is determined whether all bidders have been considered. If not, the process loops back to step 108b-1. If all bidders have been considered, the process goes to step 110 of FIG. 4.

If the selected bid fails any of the checks at steps 108b-3, 108b-4, 108b-5 or 108b-6, the process instead goes to step 108b-10, where a message is outputted to bidder i that the selected bid is invalid. The selected bid then is not entered as a valid bid. The process then goes to step 108b-8, where it is determined whether all bids by bidder i have been considered. If not, the process loops back to step 108b-2. If all bids by bidder i have been considered, the process continues to step 108b-9, where it is determined whether all bidders have been considered. If not, the process loops back to step 108b-1. If all bidders have been considered, the process goes to step 110 of FIG. 4.

Embodiments Concerned with Continuing the Auction and Price Adjustments

Figure 7:
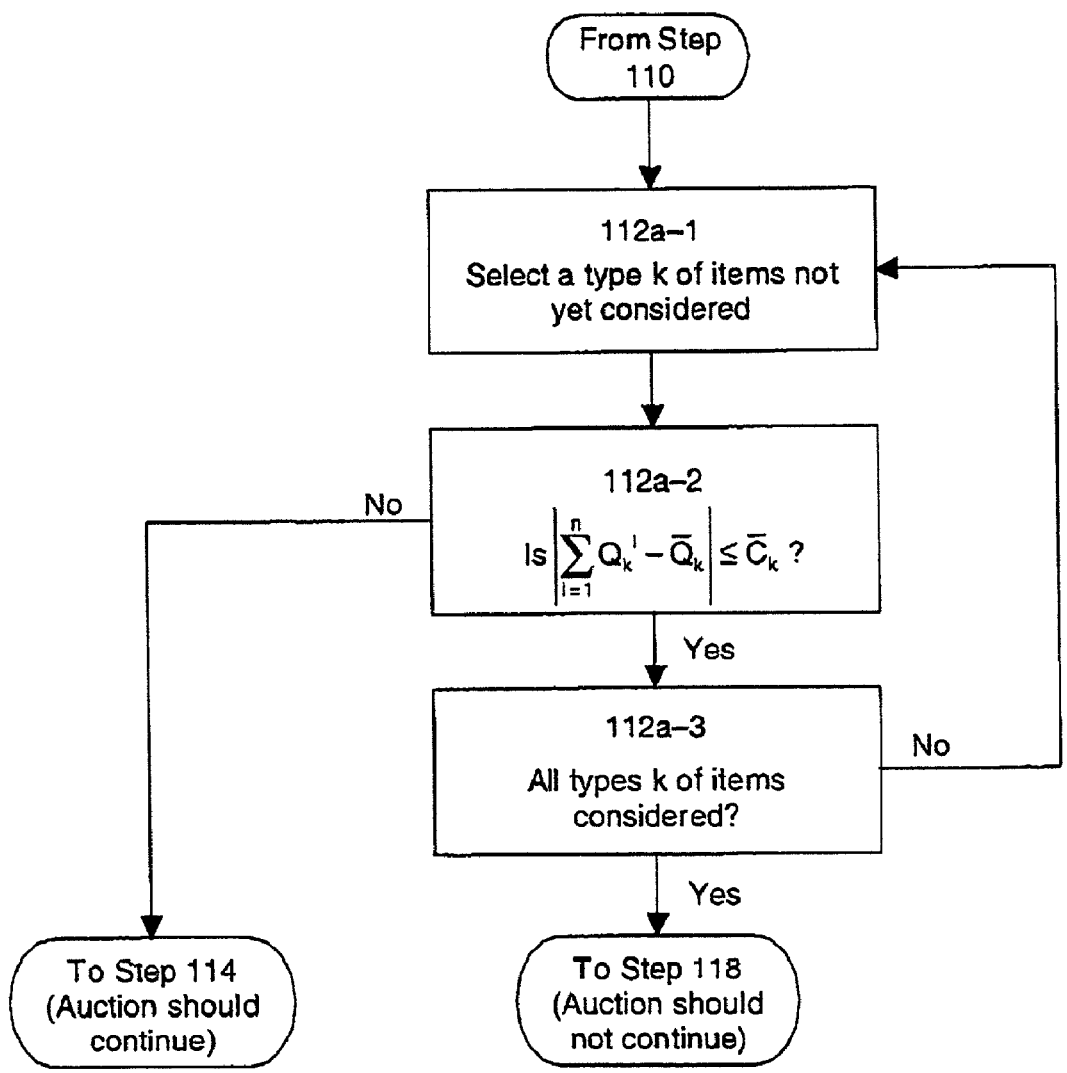
FIG. 7 is a more detailed flow diagram illustrating, in more detail, an element of the diagram of FIG. 4.

FIG. 7 is a flow diagram of a subprocess of step 112 of FIG. 4. It illustrates an exemplary process by which a computer may determine whether the auction should continue. (Related to this will also be FIG. 9b, below, which illustrates an exemplary process by which a computer determines whether the auction should continue, in a system where bidders are permitted to submit Intra-Round Bids.) FIG. 7 begins with step 112a-1, in which an item type k not yet considered is selected. In step 112a-2, a computer determines whether the aggregate quantity bid for item type k is within $\overline{C}_k$ of the available quantity, that is, whether:

$$\left| -\overline{Q}_k + \sum_{i=1}^{n} Q^i_k \right| \le \overline{C}_k.$$

The constant, $\overline{C}_k$, has the interpretation that this is the tolerance to which the auctioneer is allowing oversell or undersell to occur. If the auctioneer needs to sell exactly the available quantity of item type k, then $\overline{C}_k = 0$. If this inequality is not satisfied, then item type k has not yet cleared, and so the auction should continue. The process thus jumps immediately to step 114 of FIG. 4.

If the inequality of step 112a-2 is satisfied, the process then goes to step 112a-3, where it is determined whether all item types k have been considered. If not, the process loops back to step 112a-1. However, if all item types k have already been considered, then it has been found that all item types k have cleared within a tolerance of $\overline{C}_k$, and so the auction should not continue. The process proceeds to step 118 of FIG. 4, where the final message is generated.

Figure 8:
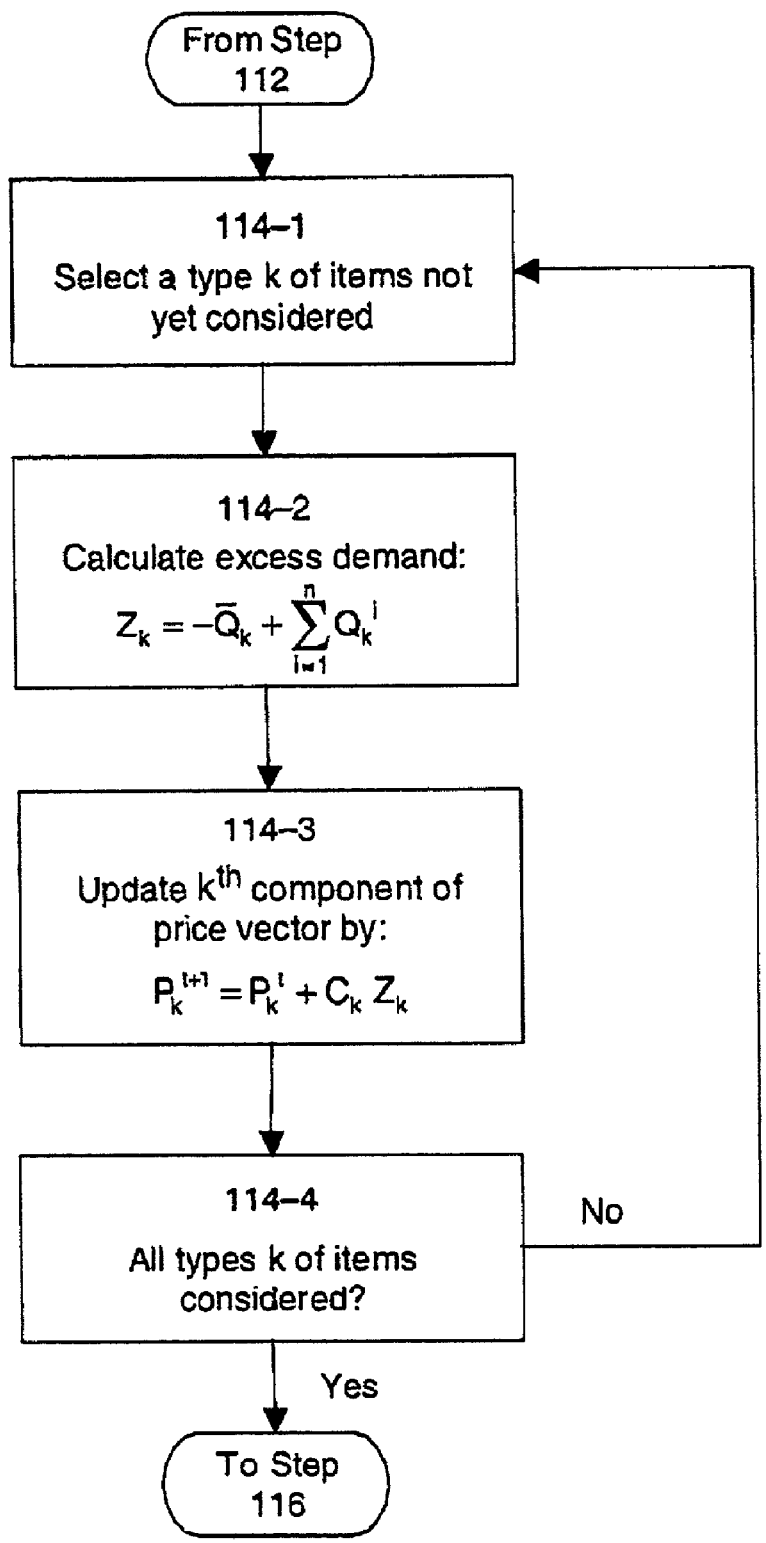
FIG. 8 is a more detailed flow diagram illustrating, in more detail, an element of the diagram of FIG. 4.

FIG. 8 is a flow diagram of a subprocess of step 114 of FIG. 4. It illustrates an exemplary process by which a computer may update the current price vector. FIG. 8 begins with step 114-1, in which an item type k not yet considered is selected. In step 114-2, a computer calculates the excess demand, denoted $Z_k$, for item type k:

$$Z_k = -\overline{Q}_k + \sum_{i=1}^{n} Q^i_k.$$

The excess demand, $Z_k$, has the interpretation of being the amount by which bidders in aggregate are bidding for quantities of item type k, in excess of the available quantity. The process then goes to step 114-3, where the $k^{th}$ component of the price vector is revised by:

$$P_k^{t+1} = P_k^t + C_k Z_k.$$

$C_k$ is any arbitrary positive constant. Thus, the price for item type k is raised if bidders bid for more than the available quantity, and the price for item type k is reduced if bidders bid for less than the available quantity. The process then continues to step 114-4, where it is determined whether all item types k have been considered. If not, the process loops back to step 114-1. However, if all item types k have already been considered, then updated prices for all item types have been generated, and the process proceeds to step 116 of FIG. 4.

Embodiments Concerned with Intra-Round Bids

In many of the leading dynamic electronic auctions in the prior art, bidders submit bids in a sequence of discrete rounds. For example, in the Federal Communications Commission auctions for radio communications spectrum or in the recent UMTS auctions held by European nations, the following would be a typical bidding schedule for an auction:

Round 1: 9:00–9:45
Round 2: 10:00–10:45
Round 3: 11:00–11:45
Round 4: 12:00–12:45
Round 5: 13:00–13:45
Round 6: 14:00–14:45
Round 7: 15:00–15:45
Round 8: 16:00–16:45

This bidding schedule would have the following interpretation. During the specified time period of each round, a bidder would be required to submit a new bid or new collection of bids (unless this bidder was already the standing high bidder on an item after the bidding of the previous round). If a bidder who was required to submit a new bid failed to submit a new bid, then (except for provisions in the rules concerning automatic waivers) the bidder would be eliminated from the auction.

By contrast, some other electronic auctions in the prior art—for example, online auctions at eBay—allow bidding to occur continuously. Rather than adhering to any rigid round schedule, bidders may submit bids at any times that they like up to a specified closing time. Related to this, there is no sense that a bidder is required to bid a certain amount by any particular time in order to retain eligibility to bid at a later time in the auction.

Many or most electronic auctions for high-valued items utilize a discrete round structure, rather than allowing bidding to occur continuously. There appear to be several reasons for this. First, a discrete round structure has desirable information properties. The auction can be easily structured so that the results of Round t are disseminated to bidders before the bids of Round t+1 need to be submitted. Second, a discrete round structure is especially conducive to enforcing "activity rules," in which a bidder is required to be active (i.e., either be the standing high bidder or place a new high bid) on a given number of items in an earlier round of the auction in order to continue to bid on a given number of items in a later round of the auction. This forces bidders to effectively disclose to their opponents (through their bidding) the values that they attach to the items, helping to mitigate the well-known "Winner's Curse" present in auctions. Third, a discrete round structure requires a bidder to repeatedly affirm, in successive rounds, his willingness to pay a given price for an item in the auction—which may be especially desirable when items such as communications licenses may sell for millions or billions of dollars or euros.

At the same time, the desirable properties of a discrete round structure may come at some considerable cost. It will typically be reasonable to hold only something like 8 to 12 rounds of bidding in a given day. As a result, the auctioneer must accept at least one of several problems:

(1) The auction may be required to last a very long time: in some North American and European spectrum auctions, the bidding extended more than 20 business days. Such a lengthy auction may be rather onerous for bidders and for the seller. In particular, it may discourage bidder participation, causing the seller to forgo substantial revenues.

(2) The bid increment between successive rounds may be required to be rather substantial: in some North American and European spectrum auctions, the bid increment between successive rounds never was allowed to drop below five percent of the previous bid. It can be argued that a seller suffers an expected revenue loss which is directly proportional to the minimum bid increment, so this may cost a seller millions of dollars or euros.

(3) The starting price may be required to be very near to the expected closing price. This may discourage bidder participation, as well as potentially eliminating the possibility of bidders getting caught up in the excitement of the auction and bidding very high prices (which is one of the advantages of conducting a dynamic auction). This also runs the risk that the auction will fail: that is, quantities bid at the starting price being less than the available quantity at the auction.

Moreover, in a clock auction, problem (2) above, a large bid increment, may lead to a heightened risk of "undersell". Consider an auction with an available quantity of 100 units of an item, and suppose a bid increment of five percent. It is quite plausible that, at a price of $1,000,000 per unit, the aggregate quantity bid by all bidders would equal 110 units, but at the next price of $1,050,000 per unit, the aggregate quantity bid by all bidders would decline to only 60 units. The auctioneer then faces the unattractive alternatives of: selling only 60 units out of the available quantity of 100 units at a price of $1,050,000 each; rationing bidders so that only 100 units, out of the 110 demanded, are sold at $1,000,000; or restarting the auction at $1,000,000. Observe however that the "undersell" problem would in all likelihood have been substantially avoided, had a much smaller bid increment been possible.

One embodiment of the present invention is a system and method for "Intra-Round Bids." A discrete round structure—with all of its many advantages—is preserved. However, in Round t+1 of the auction, the auction system and method permits bidders to submit bids at prices between the price associated with Round t and the price associated with Round t+1. Bidders have every incentive to utilize Intra-Round Bids, and to the extent that bidders utilize them, the seller should be expected to attain higher auction revenues and to reduce the probability of undersell. Thus, a system and method for Intra-Round Bids improves upon the prior art for auction systems and methods, and has immediate practical application for dynamic auctions of radio communications spectrum, securities and other financial products, electric power, etc.

While the previous and following description of Intra-Round Bids is framed largely in terms of regular auctions to sell (where bidders are buyers), the invention is equally applicable for reverse or procurement auctions to buy (where bidders are sellers). For the sake of brevity, this specification will not run through the process a second time with the roles of selling and buying reversed, but it should be clear to anybody skilled in the art that the technology can be equally used in both situations.

Here is an example illustrating the usefulness and exact meaning of Intra-Round Bids. Suppose that, in a clock auction with an available quantity of 100 units, the (end) price per unit associated with Round 4 is $1,000,000, and the (end) price per unit associated with Round 5 is $1,050,000. In an auction with discrete bidding rounds, Bidder 1 might submit a bid quantity of 55 units for Round 4 and a bid quantity of 30 units for Round 5. If there also exists a Bidder 2 who submits the same bid quantities, then we would have exactly the "undersell" problem described above: an aggregate quantity bid by all bidders of 110 units in Round 4 but only 60 units in Round 5 (with available quantity of 100 units).

With an auction system and method for Intra-Round Bids, here is an example of the bids that Bidder 1 might submit for Auction Round 5:

53 units at $1,010,000 per unit;
51 units at $1,020,000 per unit;
49 units at $1,030,000 per unit;
45 units at $1,035,000 per unit;
40 units at $1,040,000 per unit; and
30 units at $1,045,000 per unit.

These bids have the following exact meaning: the parameters corresponding to price indicate the price at which Bidder 1 wishes to change his quantity demanded as compared to his "previous" (that is, next lower price) bid. Thus, in this example:

Bidder 1 is willing to purchase 55 units (his previous bid from Round 4) at prices of $1,000,001–$1,009,999;

Bidder 1 is willing to purchase 53 units at prices of $1,010,000–$1,019,999;

Bidder 1 is willing to purchase 51 units at prices of $1,020,000–$1,029,999;

Bidder 1 is willing to purchase 49 units at prices of $1,030,000–$1,034,999;

Bidder 1 is willing to purchase 45 units at prices of $1,035,000–$1,039,999;

Bidder 1 is willing to purchase 40 units at prices of $1,040,000–$1,044,999; and Bidder 1 is willing to purchase 30 units at prices of $1,045,000–$1,049,999.

If there also exists a Bidder 2 who submits the same bid quantities, then the auctioneer would be able to declare the auction over at a price between $1,030,000 and $1,034,999, with 98 out of the 100 available units sold. The auction revenues are improved, and the undersell problem is greatly reduced.

Figure 9A:
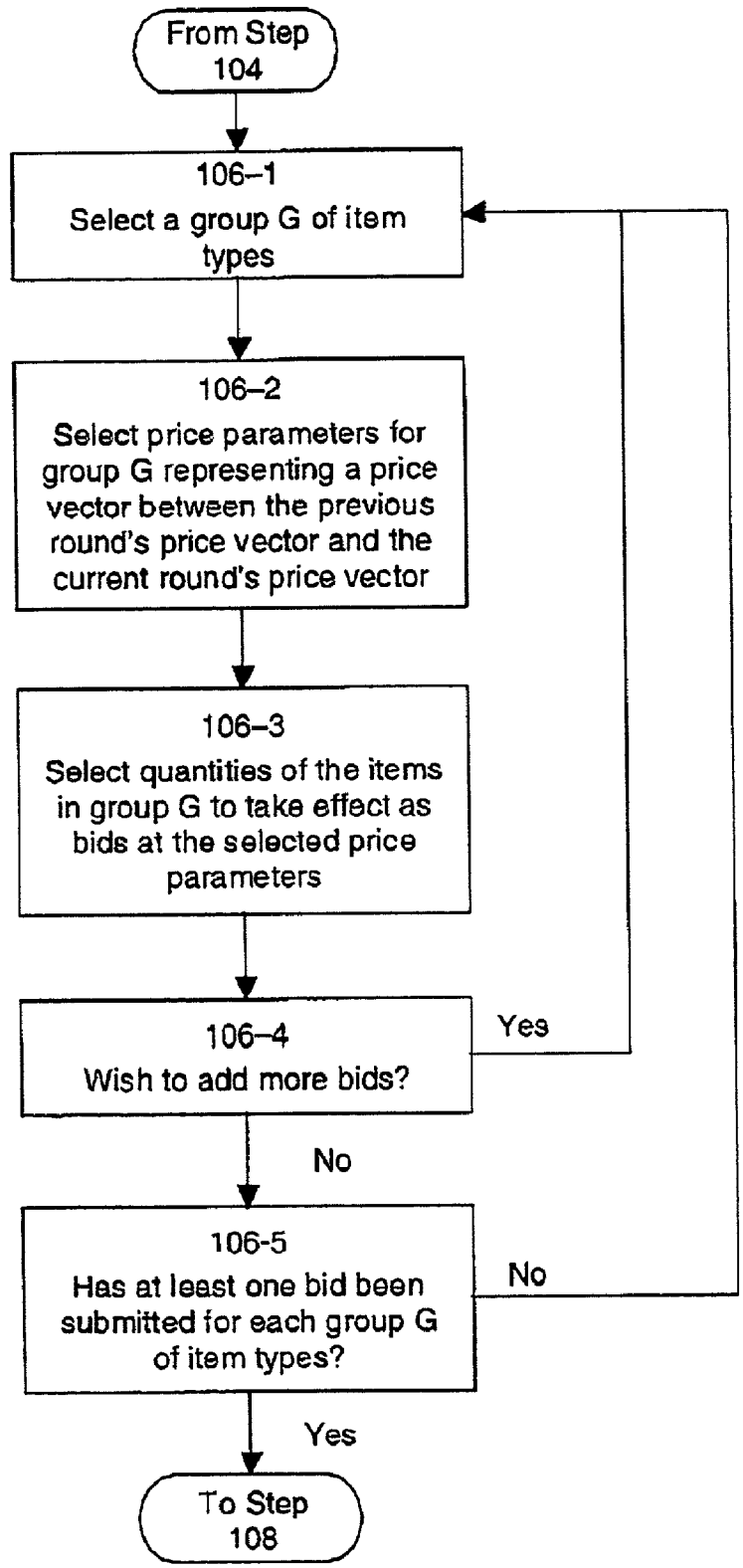
FIGS. 9a, 9b and 9c are more detailed flow diagrams illustrating, in more detail, elements of the diagram of FIG. 4.

FIG. 9a is a flow diagram of a subprocess of step 106 of FIG. 4. It illustrates an exemplary process by which a particular bidder i may submit Intra-Round Bids. FIG. 9a begins with step 106-1, in which bidder i selects a group, G, of item types on which he wishes to place a bid. G is a nonempty subset of $\{1, \ldots, m\}$, the set of all item types. In step 106-2, bidder i selects price parameters for group G representing a price vector between the previous round's price vector for group G and the current round's price vector for group G. In step 106-3, bidder i selects quantities of the item types of group G that he would like to take effect as bids at the selected price parameters. In step 106-4, bidder i expresses whether he wishes to enter more bids. If so, the process loops back to step 106-1. If not, the process continues to step 106-5. In step 106-5, the computer determines whether bidder i has submitted at least one bid for each group G of item types. If not, the process loops back to step 106-1, and optionally the computer prompts bidder i to submit bids on the groups G of item types on which bidder i has not submitted at least one valid bid in the current round. If so, the process goes to step 108 of FIG. 4.

Figure 9B:
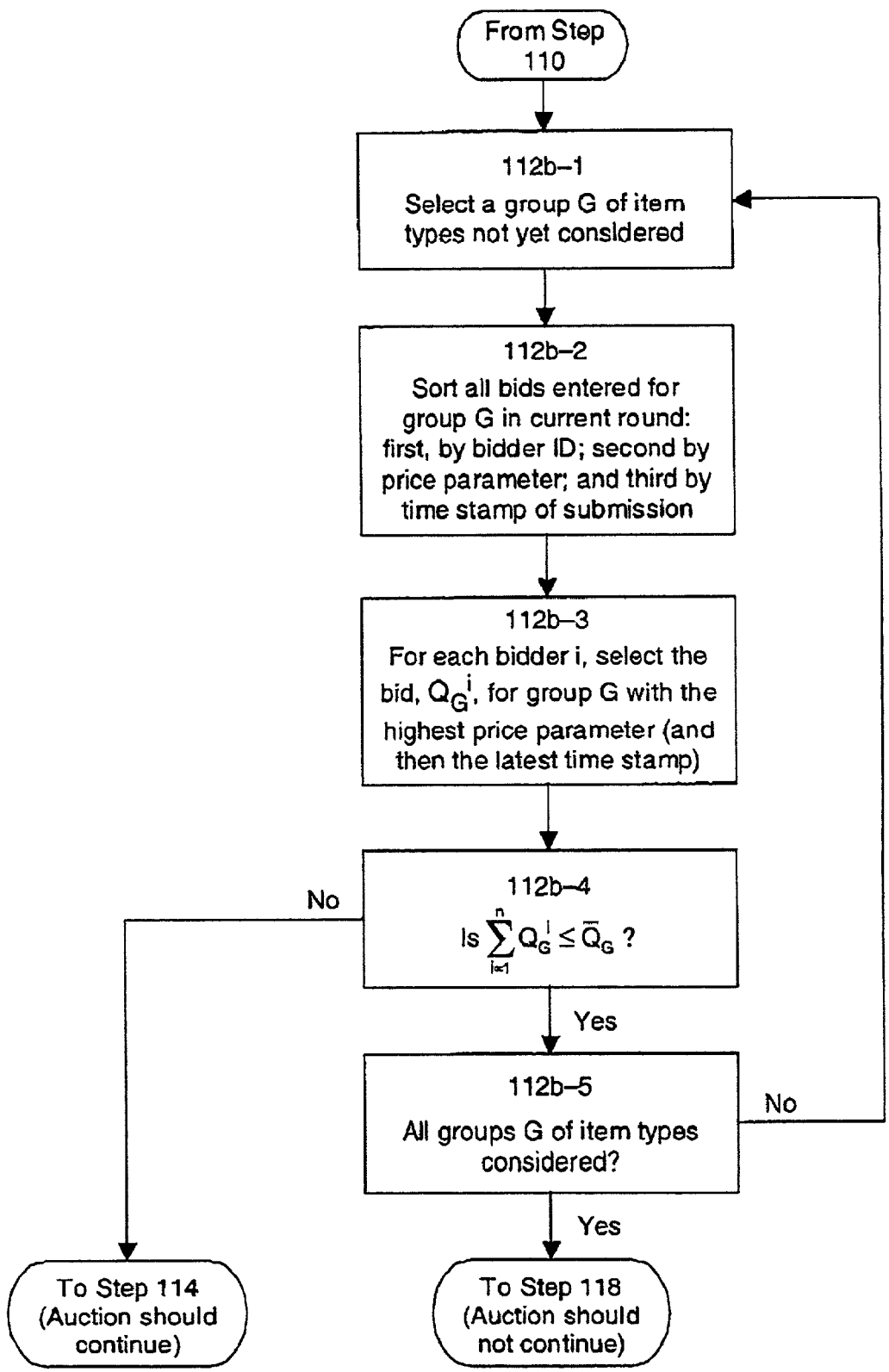

FIG. 9b is a flow diagram of a subprocess of step 112 of FIG. 4. It illustrates an exemplary process by which a computer determines whether the auction should continue, in a system where bidders are permitted to submit Intra-Round Bids. FIG. 9b begins with step 112b-1, in which a group G of item types not yet considered is selected. G is a nonempty subset of $\{1, \ldots, m\}$, the set of all item types. In step 112b-2, a computer sorts all bids entered for group G in the current round. The sorting is done: first, by bidder ID; second, by price parameter in the entered bid (in descending order); and third, by time stamp of submission (in descending order). In step 112b-3, a computer selects, for each bidder i, the bid, $Q_G^i$, for group G with the highest price parameter (and then the latest time stamp). In step 112b-4, a computer determines whether the aggregate quantity bid for group G is no greater than the available quantity, that is, whether:

$$\sum_{i=1}^{n} \sum_{k \in G} Q_k^i \leq \overline{Q}_G.$$

If this inequality is not satisfied, then group G of item types has not yet cleared, and so the auction should continue. The process thus jumps immediately to step 114 of FIG. 4.

If the inequality of step 112b-4 is satisfied, the process then goes to step 112b-5, where it is determined whether all groups G of item types have been considered. If not, the process loops back to step 112b-1. However, if all groups G of item types have already been considered, then it has been found that all groups G of item types have cleared, and so the auction should not continue. The process proceeds to step 118 of FIG. 4, where the final message is generated.

Figure 9C:
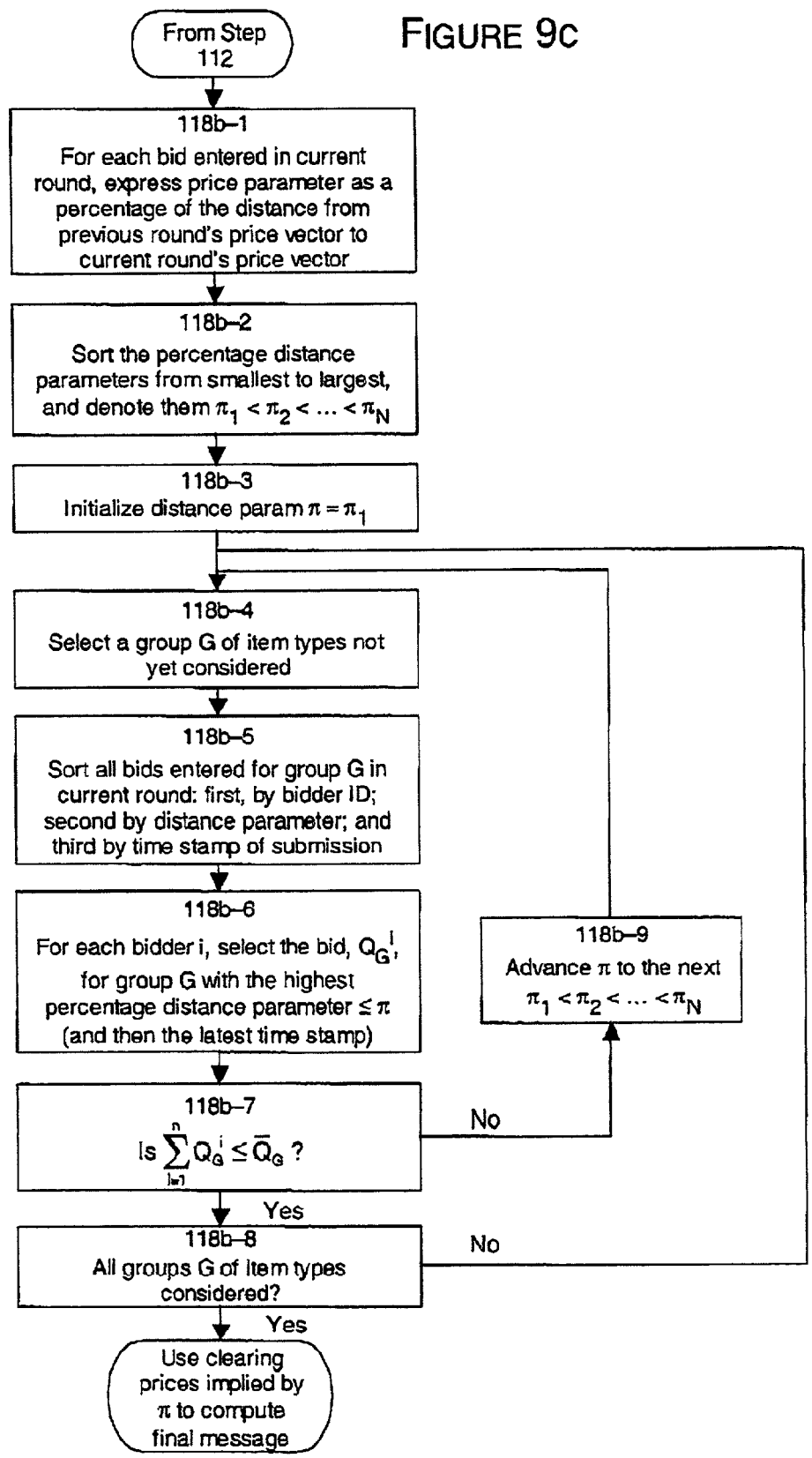

FIG. 9c is a flow diagram of a subprocess of step 118 of FIG. 4. It illustrates an exemplary process by which a computer determines final allocations and payments, in a system where bidders are permitted to submit Intra-Round Bids. FIG. 9c begins with step 118b-1, in which for each bid entered in the current round, a computer expresses the price parameter as a percentage of the distance from the previous round's price vector to the current round's price vector. For example, in the example discussed above, where the (end) price per unit associated with Round 4 was $1,000,000, and the (end) price per unit associated with Round 5 was $1,050,000, a bid with a price parameter corresponding to $1,020,000 would imply a percentage distance parameter of 40%. In step 118b-2, a computer sorts the percentage distance parameters from smallest to largest, and denotes them $\pi_1 < \pi_2 < \ldots < \pi_N$. In step 118b-3, a computer initializes the percentage distance parameter under consideration, denoted $\pi$, to be the smallest value, $\pi_1$. In step 118b-4, a group G of item types not yet considered is selected. In step 118b-5, a computer sorts all bids entered for group G in the current round. The sorting is done: first, by bidder ID; second, by percentage distance parameter in the entered bid (in descending order); and third, by time stamp of submission (in descending order). In step 118b-6, a computer selects, for each bidder i, the bid, $Q_G^i$, for group G with the highest percentage distance parameter that is less than or equal to $\pi$ (and then the latest time stamp). In step 118b-7, a computer determines whether the aggregate quantity bid for group G is no greater than the available quantity, that is, whether:

$$\sum_{i=1}^{n} \sum_{k \in G} Q_k^i \leq \overline{Q}_G.$$

If this inequality is not satisfied, then group G of item types has not yet cleared at percentage distance parameter $\pi$, and so $\pi$ needs to be incremented. The process thus goes to step 118b-9, where $\pi$ is advanced to the next percentage distance parameter among $\pi_1 < \pi_2 < \ldots < \pi_N$. The process then loops back to step 118b-4, using the new higher value for $\pi$ and starting over for groups G of item types.

If the inequality of step 118b-7 is satisfied, the process continues to step 118b-8, where it is determined whether all groups G of item types have been considered. If not, the process loops back to step 118b-4. However, if all groups G of item types have already been considered, then it has been found that all groups G of item types have cleared at percentage distance parameter $\pi$. Thus, the percentage distance parameter $\pi$ implies market-clearing prices for the auction. The process proceeds to calculate the price vector implied by percentage distance parameter $\pi$, to note the quantities bid by all bidders at this price vector, and to incorporate these computations into a final message that is outputted from a machine.

Observe that if the system and method for a dynamic clock auction with Intra-Round Bids is operated—but if the payment-account-calculation indicator of FIG. 5 is fixed at 0—this yields an embodiment of the present invention where bidders' payments are simply the dot products of their final bid vectors and the final price vector. Thus, the present invention also provides a fast and effective way to run a dynamic clock auction with a discrete round structure and uniform prices, practical use of the present invention.

The invention claimed is:

1. A method for conducting an auction of at least two types of items, each of the types of items including plural items, the method comprising:
   a. communicating a price vector, including a price for each of the types of items subject to the auction, to a plurality of bidders,
   b. receiving, bids from plural bidders wherein at least some of said bids identify quantities of items of different types,
   c. determining, based on the received bids, whether the auction should continue, and in the event that the auction will continue,
   d. sending to one or more bidders a revised price vector,
   e. receiving, further bids from plural bidders in response to the revised price vector and, in response to the further bids,
   f. crediting at least one item of a particular type with a particular bidder at a price in a closed interval between the price contained in the price vector and the price contained in the revised price vector.

2. A method as recited in claim 1 wherein at least two different types of items are related to each other.

3. A method as recited in claim 1 wherein each type of item is related to at least one different type of item.

4. A method as recited in claim 1 where the price in the closed interval is the price contained in the revised price vector.

5. A method as recited in claim 1 wherein the price in the closed interval is the price in the price vector.

6. A method as recited in claim 1 wherein at least one item of each selected type is credited to a bidder where a type is selected if the cumulative sum of quantities of that type has decreased in bids by a subset of bidders including all bidders except the bidder to be credited.

7. A method as recited in claim 1 wherein the crediting to a bidder occurs when at least one of those items, the bids for which exhibited, in the bids of bidders other than the bidder, a cumulative decrease in the further bids relative to the bids.

8. A method as recited in claim 1 wherein each type of item is the subject of a credit where, for that item, the bids exhibited, in the bids of bidders other than the bidder to be credited, a cumulative decrease in the further bids relative to the bids.

9. A method as recited in claim 1 which a further bid from a bidder is limited so that the sum of the number of items contained in a bid is less than or equal to the sum of the number of items contained in a bid submitted in the past.

10. A method as recited in claim 9 wherein the limitation is applied to a group, less than all, of the types of items.

11. A method as recited in claim 1 in which a further bid from a bidder is limited so that the number of items of any type contained in a bid is less than or equal to the number of those items contained in a bid submitted in the past.

12. A method for conducting an auction of at least two types of items, each of the types of items including plural items, the method comprising:
   a. communicating a price vector, including a price for each of the types of items subject to the auction, to a plurality of bidders,
   b. receiving, bids from plural bidders wherein at least some of said bids identify quantities of items of different types,
   c. determining, based on the received bids, whether the auction should continue, and in the event that the auction will continue,
   d. sending to one or more bidders a revised price vector,
   e. receiving, further bids from plural bidders in response to the revised price vector and, in response to the further bids, and
   f. selecting a particular bidder and determining, for a selected one of the types of items, whether the sum of the bids of other bidders is different in the further bids than in the received bids, and if it is, crediting the bidder wit a number of the selected type of items equal to the change in the sum of the bids of other bidders at a price in a closed interval between the price contained in the price vector and the price contained in the revised price vector.

13. A method as recited in claim 12 wherein the determination is effected for all other types of items.

14. A method as recited in claim 13 wherein the determination is effected for all other bidders.

15. A method as recited in claim 12 wherein the determination is repeatedly effected on receipt of bids subsequent to the further bids.

16. A method as recited in claim 12 wherein the price in the closed interval is the price contained in the revised vector.

17. A method as recited in claim 12 wherein the price in the closed interval is the price contained in the price vector.

18. A method for conducting an auction of at least two types of items, each type of the items including plural items, the method comprising:
   a. communicating a price vector, including a price for each of the types of items subject to the auction, to a plurality of bidders,
   b. receiving, bids from plural bidders wherein at least some of said bids identify quantities of items of different types,
   c. determining, based on the received bids, whether the auction should continue, and in the event that the auction will continue,
   d. sending to one or more bidders a revised price vector,
   e. receiving, further bids from plural bidders in response to the revised price vector and, in response to the further bids, and
   f. crediting, to a bidder at least one of those items, the bids for which exhibited, in the bids of bidders other than the bidder, a cumulative decrease in the further bids relative to the bids.

19. A method as recited in claim 18 wherein the credit is at a price in a closed interval between the price contained in the price vector and the price contained in the revised price vector.

20. A method as recited in claim 18 wherein at least two different types of items are related to each other.

21. A method as recited in claim 18 wherein each type of item is related to at least one different type of item.

22. A method as recited in claim 19 where the price in the closed interval is the price contained in the revised price vector.

23. A method as recited in claim 19 wherein the price in the closed interval is the price in the price vector.

24. A method for conducting an auction of at least two types of items, each of the types of items including plural items, the method comprising:
   a. communicating a price vector, including a price for each of the types of items subject to the auction, to a plurality of bidders,
   b. receiving, bids from plural bidders wherein at least some of said bids identify quantifies of different types of items, c. determining, based on the received bids, whether the auction should continue, and in the event that the auction will continue, d. sending to one or more bidders a revised price vector, e. receiving, further bids from plural bidders in response to the revised price vector and, in response to the further bids, f. crediting, to a selected bidder at least one of those items, the bids for which exhibited, in bids of bidders other than the selected bidder, a cumulative decrease in the further bids relative to the bids to establish an item credit and, g. reducing the item credit in the event bids, by bidders other than the selected bidder, show a cumulative increase in bids for that item after the item credit is established.

25. A method as recited in claim 24 wherein the credit is at a price in a closed interval between the price contained in the price vector and the price contained in the revised price vector.

26. A method as recited in claim 24 wherein at least two different types of items are related to each other.

27. A method as recited in claim 24 wherein each type of item is related to at least one different type of item.

28. A method as recited in claim 25 where the price in the closed interval is the price contained in the revised price vector.

29. A method as recited in claim 25 wherein the price in the closed interval is the price in the price vector.

30. A method for conducting an auction of at least two types of items, each type of the items including plural items, the method comprising:

a. communicating a price vector, including a price for each of the types of items subject to the auction, to a plurality of bidders, b. receiving, bids from plural bidders wherein at least some of said bids identify quantities of items of different types.

c. determining, based on the received bids, whether the auction should continue, and in the event that the auction will continue, d. sending to one or more bidders a revised price vector, and e. limiting any further bid from a bidder so that the sum of the number of items contained in a bid is less than or equal to the sum of the number of items contained in a bid submitted in the past.

31. A method as recited in claim 30 wherein the bid is limited so the sum of the number of items of different types which is less than or equal to the sum of the number of items of different types contained in a bid submitted in the past.

32. A method as recited in claim 30 wherein the bid is limited so the number of items which is less than or equal to the number of items contained in a bid submitted in the past comprises items from a single type of the items.

33. A method as recited in claim 30 wherein the bid is limited so the number of items which is less than or equal to the number of items contained in a bid submitted in the past applied separately to items from each type of the items.

34. A method as recited in claim 30 wherein the limiting is implemented by rejecting any bid in which the sum of the number of items contained in the bid is not less than or equal to the sum of the number of items contained in a bid submitted in the past.

35. A method as recited in claim 34 wherein bidders use terminals to manifest a bid and the terminal rejects any bid in which the sum of the number of items contained in the bid is not less than or equal to the sum of the number of items contained in a bid submitted in the past.

36. A method as recited in claim 30 which includes the further step of informing a bidder that a bid has been rejected as not limited so that the sum of the number of items contained in a bid is less than or equal to the sum of the number of items contained in a bid submitted in the past.

37. A method as recited in claim 36 wherein rejected bids are ignored in any determinations subsequent to the rejection.

38. A method as recited in claim 34 wherein a computer system rejects any bid in which the sum of the number of items contained in the bid is not less than or equal to the sum of the number of items contained in a bid submitted in the past.

39. A method as recited in claim 38 which includes the further step of informing a bidder that a bid has been rejected as not limited so that the sum of the number of items contained in a bid is less than or equal to the sum of the number of items contained in a bid submitted in the past.

40. A method as recited in claim 39 wherein rejected bids are ignored in any determinations subsequent to the rejection.

41. A computer system comprising one or more computers for conducting an auction of at least two types of items, each of the types of items including plural items, the system for:

a. communicating a price vector, including a price for each of the types of items subject to the auction, to a plurality of bidders, b. receiving bids from plural bidden wherein at least some of said bids identify quantities of items of different types, c. determining, based on the received bids, whether the auction should continue, and in the event that the auction will continue, d. sending to one or more bidders a revised price vector, e. receiving further bids from plural bidders in response to the revised price vector and, in response to the further bids, f. crediting at least one item of a particular type with a particular bidder at a price in a closed interval between the price contained in the price vector and the price contained in the revised price vector.

42. The system of claim 41 wherein at least two different types of items are related to each other.

43. The system of claim 41 wherein each type of item is related to at least one different type of item.

44. The system of claim 41 where the price in the closed interval is the price contained in the revised price vector.

45. The system of claim 41 wherein the price in the closed interval is the price in the price vector.

46. The system as recited in claim 41 wherein at least one item of each selected type is credited to a bidder where a type is selected if the cumulative sum of quantifies of that type has decreased in bids by a subset of bidders including all bidders except the bidder to be credited.

47. The system as recited in claim 41 wherein the crediting to a bidder occurs when at least one of those items, the bids for which exhibited, in the bids of bidders other than the bidder, a cumulative decrease in the further bids relative to the bids.

48. The system of claim 41 wherein each type of item is the subject of a credit where, for that item, the bids exhibited, in the bids of bidders other than the bidder to be credited, a cumulative decrease in the further bids relative to the bids.

49. The system of claim 41 which further includes limiting means for limiting a further bid from a bidder so that the sum of the number of items contained in a bid is less than or equal to the sum of the number of items contained in a bid submitted in the past.

50. The system of claim 49 wherein the limitation is applied to a group, less than all, of the types of items.

51. The system of claim 41 which further includes limiting means for limiting a further bid from a bidder so that the number of items of any type contained in a bid is less than or equal to the number of those items contained in a bid submitted in the past.

52. A computer system comprising one or more computers for conducting an auction of at least two types of items, each of the types of items including plural items, the system for:
  a. communicating a price vector, including a price for each of the types of items subject to the auction, to a plurality of bidders,
  b. receiving bids from plural bidders wherein at least some of said bids identify quantities of items of different types,
  c. determining, based on the received bids, whether the auction should continue, and in the event that the auction will continue,
  d. sending to one or more bidders a revised price vector,
  e. receiving further bids from plural bidders in response to the revised price vector and, in response to the further bids, and
  f. selecting a particular bidder and determining, for a selected one of the types of items, whether the sum of the bids of other bidders is different in the further bids than in the received bids, and if it is, crediting the bidder with a number of the selected type of items equal to the change in the sum of the bids of other bidders at a price in a closed interval between the price contained in the price vector and the price contained in the revised price vector.

53. The computer system of claim 52 wherein the determination is effected for all other types of items.

54. The computer system of claim 53 wherein the determination is effected for all other bidders.

55. The computer system of claim 52 wherein the determination is repeatedly effected on receipt of bids subsequent to the further bids.

56. The computer system of claim 52 wherein the price in the closed interval is the price contained in the revised vector.

57. The computer system of claim 52 wherein the price in the closed interval is the price contained in the price vector.

58. A computer system comprising one or more computers for conducting an auction of at least two types of items, each of the types of items including plural items, the system for:
  a. communicating a price vector, including a price for each of the types of items subject to the auction, to a plurality of bidders,
  b. receiving bids from plural bidders wherein at least some of said bids identify quantities of items of different types,
  c. determining, based on the received bids, whether the auction should continue, and in the event that the auction will continue,
  d. sending to one or more bidders a revised price vector,
  e. receiving further bids from plural bidders in response to the revised price vector and, in response to the further bids, and
  f. crediting, to a bidder at least one of those items, the bids for which exhibited, in the bids of bidders other then the bidder, a cumulative decrease in the further bids relative to the bids.

59. The computer system of claim 58 wherein the credit is at a price in a closed interval between the price contained in the price vector and the price contained in the revised price vector.

60. The computer system of claim 58 wherein at least two different types of items are related to each other.

61. The computer system of claim 58 wherein each type of item is related to at least one different type of item.

62. The computer system of claim 59 where the price in the closed interval is the price contained in the revised price vector.

63. The computer system as recited in claim 59 wherein the price in the closed interval is the price in the price vector.

64. A computer system comprising one or more computers for conducting an auction of at least two types of items, each of the types of items including plural items, the system for:
  a. communicating a price vector, including a price for each of the types of items subject to the auction, to a plurality of bidders,
  b. receiving bids from plural bidders wherein at least some of said bids identify quantities of different types of items,
  c. determining, based on the received bids, whether the auction should continue, and in the event that the auction will continue,
  d. sending to one or more bidders a revised price vector,
  e. receiving further bids from plural bidders in response to the revised price vector and in response to the further bids,
  f. crediting, to a selected bidder at least one of those items, the bids for which exhibited, in bids of bidders other than the selected bidder, a cumulative decrease in the further bids relative to the bids to establish an item credit, and
  g. reducing the item credit in the event bids, by bidders other than the selected bidder, show a cumulative increase in bids for that item after the item credit is established.

65. The computer system of claim 64 wherein the credit is at a price in a closed interval between the price contained in the price vector and the price contained in the revised price vector.

66. The computer system of claim 64 wherein at least two different types of items are related to each other.

67. The computer system of claim 64 wherein each type of item is related to at least one different type of item.

68. The computer system of claim 65 where the price in the closed interval is the price contained in the revised price vector.

69. The computer system of claim 65 wherein the price in the closed interval is the price in the price vector.

70. A computer system comprising one or more computers for conducting an auction of at least two types of items, each of the types of items including plural items, the system for:
  a. communicating a price vector, including a price for each of the types of items subject to the auction, to a plurality of bidders,
  b. receiving bids from plural bidders wherein at least some of said bids identify quantities of items of different types, c. determining, based on the received bids, whether the auction should continue, and in the event that the auction will continue,
d. sending to one or more bidders a revised price vector, and
e. limiting any further bid from a bidder so that the sum of the number of items contained in a bid is less than or equal to the sum of the number of items contained in a bid submitted in the past.

71. The computer system of claim 70 in which bids are limited so that the sum of the number of items of different types which is less than or equal to the sum of the number of items of different types contained in a bid submitted in the past is limited to the items form a group of types of items, where the group of types of items is less tan all types of items.

72. The computer system of claim 70 in which bids are limited so that the number of items, which is less than or equal to the number of items contained in a bid submitted in the past, comprise items from a single type of the items.

73. The computer system of claim 70 in which bids are limited so that the number of items which is less than or equal to the number of items contained in a bid submitted in the past, is applied separately to items from each type of the items.

74. The computer system as recited in claim 70 in which the limiting is implemented by rejecting any bid in which the sum of the number of items contained in the bid is not less than or equal to the sum of the number of items contained in a bid submitted in the past.

75. The computer system of claim 74 which further includes terminals, used by bidders, to manifest a bid and a terminal used by a bidder rejects any bid in which the sum of the number of items contained in the bid is not less than or equal to the sum of the number of items contained in a bid submitted in the past.

76. The computer system of claim 74 which includes means for informing a bidder that a bid has been rejected as not limited so that the sum of the number of items contained in a bid is less than or equal to the sum of the number of items contained in a bid submitted in the past.

77. The computer system of claim 76 wherein rejected bids are ignored in any determinations subsequent to the rejection.

78. The computer system of claim 74 wherein the computer system rejects any bid in which the sum of the number of items contained in the bid is not less than or equal to the sum of the number of items contained in a bid submitted in the past.

79. The computer system of claim 78 which includes means for informing a bidder that a bid has been rejected as not limited so that the sum of the number of items contained in a bid is less than or equal to the sum of the number of items contained in a bid submitted in the past.

80. The computer system of claim 79 wherein rejected bids are ignored in any determinations subsequent to the rejection.

* * * * *